US012414887B2

(12) United States Patent
Kaikenger et al.

(10) Patent No.: US 12,414,887 B2
(45) Date of Patent: Sep. 16, 2025

(54) PRONING FRAME FOR A PATIENT BED

(71) Applicant: Hill-Rom Services, Inc., Batesville, IN (US)

(72) Inventors: Philippe Kaikenger, Pluvigner (FR); Jean-Bernard Duvert, Baud (FR); Mickael Audic, Locmiquélic (FR); Joshua C. Hight, Littleton, MA (US); Alejandro Noe Conejo Castano, Batesville, IN (US); Jonathan K. Moenter, Batesville, IN (US); Lori A. Zapfe, Milroy, IN (US); Heather D. Kooiker, Caledonia, MI (US); Christine Abousaleh, Chicago, IL (US); Carlos A. Urrea, Glenview, IL (US); Morgan M. Dreyer, Versailles, IN (US)

(73) Assignee: Hill-Rom Services, Inc., Batesville, IN (US)

(*) Notice: Subject to any disclaimer, the term of this patent is extended or adjusted under 35 U.S.C. 154(b) by 424 days.

(21) Appl. No.: 17/462,295

(22) Filed: Aug. 31, 2021

(65) Prior Publication Data

US 2022/0125653 A1 Apr. 28, 2022

Related U.S. Application Data

(60) Provisional application No. 63/155,827, filed on Mar. 3, 2021, provisional application No. 63/105,094, filed on Oct. 23, 2020.

(51) Int. Cl.
*A61G 7/07* (2006.01)
*A47C 20/02* (2006.01)
(Continued)

(52) U.S. Cl.
CPC ............ *A61G 7/072* (2013.01); *A47C 20/026* (2013.01); *A47G 9/1054* (2013.01); *A61G 7/065* (2013.01);
(Continued)

(58) Field of Classification Search
CPC .......... A61G 7/072; A61G 7/07; A61G 7/065; A61G 7/1084; A61G 7/1082;
(Continued)

(56) References Cited

U.S. PATENT DOCUMENTS 2,872,259 A * 2/1959 Thorpe .................. A61G 13/00 5/624
3,411,766 A * 11/1968 Lanigan ............... A61G 13/105 5/619
(Continued)

FOREIGN PATENT DOCUMENTS

CN 202776847 U 3/2013
CN 206491959 U 9/2017
(Continued)

OTHER PUBLICATIONS

"Proning Made Easy at Keesler AFB" Apr. 23, 2010, link: https://www.aetc.af.mil/News/Article/2164186/proning-made-easy-at-keesler-afb/, retrieve on Sep. 22, 2020, Military Health System Communication Office.
(Continued)

*Primary Examiner* — Justin C Mikowski
*Assistant Examiner* — Morgan J McClure
(74) *Attorney, Agent, or Firm* — Barnes & Thornburg LLP

(57) ABSTRACT

A head rest accessory for coupling to a frame member at a head end of a pivotable torso support section of a hospital bed is provided. A frame is configured to couple to the frame member. A head rest mount is coupled to the frame and is
(Continued)

repositionable along the frame. A head rest is coupled to the head rest mount and includes a face rest shell. A first angle sensor is positioned along a side of the face rest shell. A second angle sensor is positioned on a head end of the face rest shell.

18 Claims, 22 Drawing Sheets

(51) Int. Cl.

| | |
|---|---|
| ***A47G 9/10*** | (2006.01) |
| ***A61G 7/065*** | (2006.01) |
| ***A61G 13/10*** | (2006.01) |
| ***A61G 13/12*** | (2006.01) |
| ***A61G 15/12*** | (2006.01) |

(52) U.S. Cl.
CPC .............. *A61G 7/07* (2013.01); *A61G 13/101* (2013.01); *A61G 13/12* (2013.01); *A61G 15/12* (2013.01); *A61H 2205/022* (2013.01)

(58) Field of Classification Search
CPC .......... A61G 2203/42; A61G 2200/325; A61G 13/121; A61G 13/12; A61G 13/101; A61G 13/1295; A61G 15/125; A61G 15/12; A47C 20/026; A47G 9/1054; A61H 2201/1604; A61H 2201/1607; A61H 2205/022
See application file for complete search history.

(56) References Cited

U.S. PATENT DOCUMENTS

| | | | | | |
|---|---|---|---|---|---|
| 4,279,038 | A * | 7/1981 | Bruckner | A42B 3/00 | 2/908 |
| 5,147,287 | A * | 9/1992 | Jewell | A61G 13/12 | 602/33 |
| 5,177,823 | A * | 1/1993 | Riach | A61G 15/125 | 5/636 |
| 5,276,927 | A * | 1/1994 | Day | A61B 90/14 | 5/601 |
| 5,362,021 | A * | 11/1994 | Phillips | A61G 13/101 | 5/507.1 |
| 5,628,078 | A * | 5/1997 | Pennington | A61G 13/10 | 5/613 |
| 5,661,859 | A * | 9/1997 | Schaefer | A61G 13/08 | 5/632 |
| 6,042,184 | A * | 3/2000 | Kofoed | A47C 20/026 | 297/391 |
| 6,049,926 | A * | 4/2000 | Amaral | A61G 13/12 | 5/643 |
| 6,112,333 | A * | 9/2000 | Mazzei | A61G 13/12 | 5/643 |
| 6,151,734 | A * | 11/2000 | Lawrie | A47C 20/026 | 5/643 |
| 6,276,012 | B2 * | 8/2001 | Borders | A61G 13/08 | 5/636 |
| 6,374,441 | B1 * | 4/2002 | Begell | A47G 9/1009 | 5/636 |
| 6,460,207 | B1 * | 10/2002 | Papay | A61G 13/12 | 5/643 |
| 6,490,737 | B1 * | 12/2002 | Mazzei | A61G 13/12 | 2/9 |
| 7,089,613 | B2 * | 8/2006 | Cohen | A61G 13/12 | 5/640 |
| 7,117,551 | B1 * | 10/2006 | Dinkler, II | A61G 13/12 | 5/643 |
| 7,426,763 | B2 * | 9/2008 | Mazzei | A61G 13/12 | 5/643 |
| D603,967 | S * | 11/2009 | Berry | D24/184 | |
| 7,730,563 | B1 * | 6/2010 | Sklar | A61G 13/121 | 5/640 |
| 8,234,731 | B2 | 8/2012 | Skripps | | |
| 8,360,066 | B2 * | 1/2013 | Piontek | A61G 13/12 | 128/857 |
| 8,555,439 | B2 * | 10/2013 | Soto | A61G 13/101 | 128/869 |
| D704,828 | S * | 5/2014 | Lin | D24/127 | |
| 9,155,672 | B2 * | 10/2015 | Farag | A61G 13/121 | |
| 9,516,959 | B2 * | 12/2016 | Noh | A47G 9/1054 | |
| 9,980,573 | B2 * | 5/2018 | Bennetts | A61G 13/12 | |
| 10,201,240 | B1 * | 2/2019 | Arrighi | A47G 9/1054 | |
| 10,258,520 | B1 * | 4/2019 | Beltran | A61G 5/125 | |
| 10,555,860 | B2 * | 2/2020 | Hinton | A61G 13/06 | |
| 10,959,687 | B2 * | 3/2021 | Yakacki | A61B 6/04 | |
| 11,013,574 | B1 * | 5/2021 | Gomez | A61B 17/00234 | |
| 2001/0032364 | A1 * | 10/2001 | VanSteenburg | A61G 13/0072 | 5/621 |
| 2002/0170115 | A1 * | 11/2002 | Borders | A61G 13/101 | 5/624 |
| 2006/0053557 | A1 * | 3/2006 | Damron | A61G 13/121 | 5/636 |
| 2006/0242765 | A1 * | 11/2006 | Skripps | A61G 13/04 | 5/624 |
| 2006/0253985 | A1 * | 11/2006 | Skripps | A61G 13/129 | 5/622 |
| 2006/0255220 | A1 * | 11/2006 | Skripps | A61G 13/04 | 248/228.4 |
| 2006/0290194 | A1 * | 12/2006 | Roleder | A47C 20/026 | 297/397 |
| 2008/0005841 | A1 * | 1/2008 | Zelnik | A47C 20/026 | 5/601 |
| 2008/0271248 | A1 * | 11/2008 | DeLaura | A61G 13/0054 | 5/638 |
| 2010/0319706 | A1 * | 12/2010 | Berry | A61G 13/121 | 128/845 |
| 2010/0325802 | A1 * | 12/2010 | Schwartz | A61H 37/00 | 5/636 |
| 2011/0119829 | A1 * | 5/2011 | Skripps | A61B 6/0421 | 5/601 |
| 2012/0124748 | A1 * | 5/2012 | Soto | A61G 13/101 | 5/640 |
| 2012/0260429 | A1 * | 10/2012 | Rolfes | A61G 13/121 | 5/637 |
| 2013/0232696 | A1 * | 9/2013 | Halimi | A47C 16/00 | 5/640 |
| 2013/0247301 | A1 * | 9/2013 | Daley | A61G 13/101 | 5/613 |
| 2013/0305455 | A1 * | 11/2013 | Davis | A61G 13/1215 | 5/639 |
| 2014/0000630 | A1 * | 1/2014 | Ford | A61G 13/12 | 128/845 |
| 2014/0245537 | A1 * | 9/2014 | Allen | A61G 13/04 | 5/622 |
| 2014/0245539 | A1 * | 9/2014 | Ooba | A47C 27/083 | 5/636 |
| 2014/0296747 | A1 * | 10/2014 | Herrnsdorf | A47G 9/10 | 128/845 |
| 2014/0346834 | A1 * | 11/2014 | Skursky | A47C 1/024 | 297/397 |
| 2015/0059094 | A1 * | 3/2015 | Jackson | A61G 13/104 | 5/608 |
| 2015/0094780 | A1 * | 4/2015 | Krickeberg | A61G 13/101 | 606/86 R |
| 2015/0223622 | A1 * | 8/2015 | Mobley | B32B 7/14 | 5/636 |
| 2015/0257958 | A1 * | 9/2015 | Allen | A61G 13/101 | 108/49 |
| 2016/0151221 | A1 * | 6/2016 | Mount | A47C 7/38 | 5/636 |
| 2017/0143564 | A1 * | 5/2017 | Sevadjian | A61G 13/08 | |
| 2017/0273481 | A1 * | 9/2017 | Du | A61G 13/121 | |
| 2018/0042409 | A1 * | 2/2018 | Johnson | A61G 13/121 | |
| 2018/0085270 | A1 * | 3/2018 | Elias | A61G 7/075 | |
| 2018/0213932 | A1 * | 8/2018 | Reimers | A47F 5/0838 | |
| 2020/0016018 | A1 * | 1/2020 | Du | A61G 15/007 | |

(56) References Cited

U.S. PATENT DOCUMENTS

| | | | | |
|---|---|---|---|---|
| 2020/0046296 | A1* | 2/2020 | Romano | A61B 5/704 |
| 2020/0146639 | A1* | 5/2020 | Campagna | A61B 6/032 |
| 2020/0345572 | A1* | 11/2020 | Cooke | A61B 90/10 |
| 2021/0000685 | A1* | 1/2021 | Lurie | A61H 31/008 |
| 2021/0169721 | A1* | 6/2021 | Huber | A61G 7/072 |
| 2021/0212876 | A1* | 7/2021 | Johnson | A61G 15/12 |
| 2021/0298683 | A1* | 9/2021 | Jung | G01G 19/445 |
| 2021/0330102 | A1* | 10/2021 | Monico | A47G 9/1054 |
| 2021/0369522 | A1* | 12/2021 | Nahavandi | A61G 7/0527 |
| 2022/0007845 | A1* | 1/2022 | Mace | A47C 7/38 |
| 2022/0125392 | A1* | 4/2022 | Lim | A61B 6/42 |
| 2022/0265501 | A1* | 8/2022 | Elia | G08B 21/182 |
| 2022/0273512 | A1* | 9/2022 | Albino | A61G 7/065 |
| 2023/0095554 | A1* | 3/2023 | Garfoot | A61G 1/04<br>5/622 |
| 2023/0104608 | A1* | 4/2023 | Kain | A61G 13/101<br>5/622 |

FOREIGN PATENT DOCUMENTS

| | | | |
|---|---|---|---|
| CN | 209122708 | U | 7/2019 |
| CN | 209122709 | U | 7/2019 |
| CN | 210447796 | U | 5/2020 |
| DE | 202017000091 | U1 | 3/2017 |
| GB | 261511 | A | 11/1926 |
| WO | 201040120 | A2 | 4/2010 |

OTHER PUBLICATIONS

Karpe et al., “A novel head support device for prone positioning in acute respiratory distress syndrome”, Jun. 28, 2019, 368-370 pages, vol. 36 Issue 4, Wolters Kluwer—Medknow.

* cited by examiner

PRONING FRAME FOR A PATIENT BED

CROSS-REFERENCE TO RELATED APPLICATIONS

This application claims priority under 35 U.S.C. § 119(e) to U.S. Provisional Patent Application Ser. No. 63/105,094, filed Oct. 23, 2020, and U.S. Provisional Patent Application Ser. No. 63/155,827, filed Mar. 3, 2021, both of which are expressly incorporated by reference herein.

BACKGROUND

The present disclosure relates to hospital beds that enable proning of a patient and, more particularly, to a head rest attachment for a hospital bed that enables the patient to lie in the prone position.

Proning is the process of turning a patient with precise, safe motions from their back onto their abdomen (stomach) so that the patient is lying face down. Proning is used to improve the respiratory function in high risk patients. During proning, the patient is placed in prone position for extended amounts of time. The patient's head must be supported during proning, and the patient cannot be placed face down on a mattress. Accordingly, providing comfort for the patient is desirable. Additionally, during proning, caregivers need to have access to the patient's face for intubation purposes.

Generally, C-Prone masks do not include tilt indicators. Accordingly it is difficult for a caregiver to know an exact position of the mask when adjusting the mask after positioning a patient's head on the mask. If the mask has a lateral tilt, an undesirable pressure interface distribution may occur on the patient's face, thereby producing skin injuries. Without a longitudinal tilt indicator, the caregiver cannot improve the patient's head positioning to accommodate patient morphology after observation of the posture of the patient's head and neck. Moreover, without tilt indicators, it is not possible to pre-set a mask position before fixing the mask on the bed. Accordingly, all position setting must be done after the patient's head is positioned on the mask.

SUMMARY

The present disclosure includes one or more of the features recited in the appended claims and/or the following features which, alone or in any combination, may comprise patentable subject matter.

According to a first aspect of the disclosed embodiments, a head rest accessory for coupling to a frame member at a head end of a pivotable torso support section of a hospital bed includes a frame having a pair of rails that are spaced apart and substantially parallel and that extend from a distal end to a proximal end. A crossbeam is coupled to the distal ends of the pair of rails. A U-shaped connector is coupled to the proximal ends of a respective rail of the pair of rails. The U-shaped connector opens downwardly to permit the U-shaped connector to be insertable downwardly over the frame member to couple the frame to the pivotable torso support section so that the frame is cantilevered from the frame member. A head rest mount is coupled to the frame and extends between the pair of rails. The head rest mount has at least one releasable clamp that grips a corresponding one of the pair of rails to lock the head rest mount in place on the frame when the releasable clamp is in a locked condition. The head rest mount is repositionable along the pair of rails when the releasable clamp is in an unlocked condition. A head rest is coupled to the head rest mount. The head rest includes a face rest shell having an upwardly facing concave surface and having a generally T-shaped cutout to receive a patient's eyes, nose, mouth, and a central chin region of the patient's face when the patient is in a prone position on the head rest accessory.

In some embodiments of the first aspect, the crossbeam may extend orthogonal to each of the pair of rails. The U-shaped connector may extend perpendicular to the frame. The U-shaped connector may include a pair of flanges and a slot extending between the pair of flanges. Each of the pair of flanges may include a planar surface. The slot may be defined by the planar surfaces of the pair of flanges. The crossbeam may include a rod. Each of the pair of rails may have a rectangular cross-section taken in a vertical plane. Each of the pair of rails may include a loop configured to position over a base frame of the bed when the bed is in a Trendelenburg position. The U-shaped connector may include a pair of sockets. Each loop may include a post configured to be inserted into a respective socket. The posts may be removably inserted into each of the pair of sockets. At least a portion of the U-shaped connector may include at least one of a plastic and composite.

Optionally, in the first aspect, the head rest mount may be repositionable along the pair of rails along a longitudinal axis of the hospital bed. The head rest mount may include a base that is repositionable along the pair of rails. The base may include a track and a body repositionable along the track in a direction perpendicular to the longitudinal axis of the hospital bed. A post may extend vertically from the body. A mount rail may extend from the post and repositionable vertically along the post. The head rest may be coupled to a cantilevered end of the rail.

It may be desired, in the first aspect, that a face cushion is positioned on the concave surface of the face rest shell. The face cushion may include a surface that is sized and shaped to the patient's face. The face cushion may include a generally T-shaped cutout to receive a patient's eyes, nose, mouth, and a central chin region of the patient's face when the patient is in a prone position on the head rest accessory.

According to a second aspect of the disclosed embodiments, a head rest accessory for coupling to a frame member at a head end of a pivotable torso support section of a hospital bed includes a frame having a pair of rails that are spaced apart and substantially parallel and that extend from a distal end to a proximal end. A crossbeam is coupled to the distal ends of the pair of rails. A U-shaped connector is coupled to and extends orthogonally from the proximal ends of a respective rail of the pair of rails. The U-shaped connector opens downwardly to permit the U-shaped connector to be insertable downwardly over the frame member to couple the frame to the pivotable torso support section so that the frame is cantilevered from the frame member. A head rest mount is coupled to the frame and extends between the pair of rails. The head rest mount has at least one releasable clamp that grips a corresponding one of the pair of rails to lock the head rest mount in place on the frame when the releasable clamp is in a locked condition. The head rest mount is repositionable along the pair of rails along a longitudinal axis of the hospital bed when the releasable clamp is in an unlocked condition. A head rest is coupled to the head rest mount. The head rest includes a face rest shell having an upwardly facing concave surface and having a generally T-shaped cutout to receive a patient's eyes, nose, mouth, and a central chin region of the patient's face when the patient is in a prone position on the head rest accessory.

In some embodiments of the second aspect, the crossbeam may extend orthogonal to each of the pair of rails. The U-shaped connector may extend perpendicular to the frame. The U-shaped connector may include a pair of flanges and a slot extending between the pair of flanges. Each of the pair of flanges may include a planar surface. The slot may be defined by the planar surfaces of the pair of flanges. The crossbeam may include a rod. Each of the pair of rails may have a rectangular cross-section taken in a vertical plane. Each of the pair of rails may include a loop configured to position over a base frame of the bed when the bed is in a Trendelenburg position. The U-shaped connector may include a pair of sockets. Each loop may include a post configured to be inserted into a respective socket. The posts may be removably inserted into each of the pair of sockets. At least a portion of the U-shaped connector may include at least one of a plastic and composite.

Optionally, in the second aspect, the head rest mount may include a base that is repositionable along the pair of rails. The base may include a track and a body repositionable along the track in a direction perpendicular to the longitudinal axis of the hospital bed. A post may extend vertically from the body. A mount rail may extend from the post and repositionable vertically along the post. The head rest may be coupled to a cantilevered end of the rail.

It may be desired, in the second aspect, that a face cushion is positioned on the concave surface of the face rest shell. The face cushion may include a surface that is sized and shaped to the patient's face. The face cushion may include a generally T-shaped cutout to receive a patient's eyes, nose, mouth, and a central chin region of the patient's face when the patient is in a prone position on the head rest accessory.

According to a third aspect of the disclosed embodiments, a head rest accessory for coupling to a frame member at a head end of a pivotable torso support section of a hospital bed includes a C-shaped frame having a pair of rails that are spaced apart and substantially parallel and that extend from a distal end to a proximal end. A crossbeam is coupled to the distal ends of the pair of rails. A U-shaped connector is coupled to the proximal ends of a respective rail of the pair of rails. The U-shaped connector includes a pair of flanges having planar surfaces and a slot extending between the pair of flanges. The slot is defined by the planar surfaces of the pair of flanges. The U-shaped connector opens downwardly to permit the U-shaped connector to be insertable downwardly over the frame member to couple the frame to the pivotable torso support section so that the frame is cantilevered from the frame member. A head rest mount is coupled to the frame and extends between the pair of rails. The head rest mount has at least one releasable clamp that grips a corresponding one of the pair of rails to lock the head rest mount in place on the frame when the releasable clamp is in a locked condition. The head rest mount is repositionable along the pair of rails when the releasable clamp is in an unlocked condition. A head rest is coupled to the head rest mount. The head rest includes a face rest shell having an upwardly facing concave surface and having a generally T-shaped cutout to receive a patient's eyes, nose, mouth, and a central chin region of the patient's face when the patient is in a prone position on the head rest accessory.

In some embodiments of the third aspect, the crossbeam may extend orthogonal to each of the pair of rails. The U-shaped connector may extend perpendicular to the frame. The U-shaped connector may include a pair of flanges and a slot extending between the pair of flanges. Each of the pair of flanges may include a planar surface. The slot may be defined by the planar surfaces of the pair of flanges. The crossbeam may include a rod. Each of the pair of rails may have a rectangular cross-section taken in a vertical plane. Each of the pair of rails may include a loop configured to position over a base frame of the bed when the bed is in a Trendelenburg position. The U-shaped connector may include a pair of sockets. Each loop may include a post configured to be inserted into a respective socket. The posts may be removably inserted into each of the pair of sockets. At least a portion of the U-shaped connector may include at least one of a plastic and composite.

Optionally, in the third aspect, the head rest mount may be repositionable along the pair of rails along a longitudinal axis of the hospital bed. The head rest mount may include a base that is repositionable along the pair of rails. The base may include a track and a body repositionable along the track in a direction perpendicular to the longitudinal axis of the hospital bed. A post may extend vertically from the body. A mount rail may extend from the post and repositionable vertically along the post. The head rest may be coupled to a cantilevered end of the rail.

It may be desired, in the third aspect, that a face cushion is positioned on the concave surface of the face rest shell. The face cushion may include a surface that is sized and shaped to the patient's face. The face cushion may include a generally T-shaped cutout to receive a patient's eyes, nose, mouth, and a central chin region of the patient's face when the patient is in a prone position on the head rest accessory.

According to a fourth aspect of the disclosed embodiment, a head rest accessory for coupling to a frame member at a head end of a pivotable torso support section of a hospital bed includes a frame having a pair of rails that are spaced apart and substantially parallel and that extend from a distal end to a proximal end. A crossbeam is coupled to the distal ends of the pair of rails. A U-shaped connector is coupled to the proximal ends of a respective rail of the pair of rails. The U-shaped connector opens downwardly to permit the U-shaped connector to be insertable downwardly over the frame member to couple the frame to the pivotable torso support section so that the frame is cantilevered from the frame member. A head rest mount is coupled to the frame and extends between the pair of rails. The head rest mount has at least one releasable clamp that grips a corresponding one of the pair of rails to lock the head rest mount in place on the frame when the releasable clamp is in a locked condition. The head rest mount is repositionable along the pair of rails when the releasable clamp is in an unlocked condition. A head rest is coupled to the head rest mount. The head rest includes a face rest shell having an upwardly facing concave surface and having a generally T-shaped cutout to receive a patient's eyes, nose, mouth, and a central chin region of the patient's face when the patient is in a prone position on the head rest accessory. The head rest includes a face cushion positioned on the face rest shell and moveable relative to the frame in three dimensions.

In some embodiments of the fourth aspect, the crossbeam may extend orthogonal to each of the pair of rails. The U-shaped connector may extend perpendicular to the frame. The U-shaped connector may include a pair of flanges and a slot extending between the pair of flanges. Each of the pair of flanges may include a planar surface. The slot may be defined by the planar surfaces of the pair of flanges. The crossbeam may include a rod. Each of the pair of rails may have a rectangular cross-section taken in a vertical plane. Each of the pair of rails may include a loop configured to position over a base frame of the bed when the bed is in a Trendelenburg position. The U-shaped connector may include a pair of sockets. Each loop may include a post configured to be inserted into a respective socket. The posts may be removably inserted into each of the pair of sockets. At least a portion of the U-shaped connector may include at least one of a plastic and composite.

Optionally, in the fourth aspect, the head rest mount may be repositionable along the pair of rails in a first dimension along a longitudinal axis of the hospital bed. The head rest mount may include a base that is repositionable in the first dimension along the pair of rails. The base may include a track and a body repositionable along the track in a second dimension perpendicular to the longitudinal axis of the hospital bed. A post may extend vertically from the body. A mount rail may extend from the post and repositionable in a third dimension along the post. The head rest may be coupled to a cantilevered end of the rail.

It may be desired, in the fourth aspect, that the face cushion is positioned on the concave surface of the face rest shell. The face cushion may include a generally T-shaped cutout to receive a patient's eyes, nose, mouth, and a central chin region of the patient's face when the patient is in a prone position on the head rest accessory.

According to any of the aspects set forth above, the head rest may be rotatable about the mount rail in a first rotational direction to roll the head rest. The head rest may be rotatable about the mount rail in a second rotational direction to pitch the head rest. The head rest may be rotatable about the mount rail in a third rotational direction to yaw the head rest.

According to any of the aspects set forth above, the face rest shell may include a downwardly facing convex surface opposite the upwardly facing concave surface. An outer perimeter may have a partially circular top outer edge and a bottom outer edge. The outer perimeter may include a pair of planar side outer edges extending between the top outer edge and the bottom outer edge. A bottom opening may be formed in the bottom outer edge. The generally T-shaped cutout may extend from the bottom opening. The generally T-shaped cutout may be defined by an inner edge. The generally T-shaped cutout may include a mouth cutout extending from the opening and an eye cutout extending from the mouth cutout. The eye cutout may be defined by a planar top inner edge and a pair of curved inner edges extending from the planar top inner edge. The concave surface and the convex surface may extend between the inner edge of the cutout and the outer perimeter.

In some embodiments of any of the above aspects, the bottom outer edge may include a pair of planar bottom outer edges. The opening may be formed between the pair of bottom outer edges. Each of a pair of planar angled outer edges may extend between one of the pair of planar side outer edges and one of the planar bottom outer edges. The planar top inner edge of the eye cutout may extend substantially perpendicular to the pair of planar side outer edges of the outer perimeter. The planar top inner edge of the eye cutout may extend substantially parallel to each of the pair of planar bottom outer edges. The pair of curved inner edges of the eye cutout may be at least partially circular. The pair of curved inner edges of the eye cutout may be at least partially arcuate.

Optionally, in any of the above aspects, the face rest shell may include a pair of cheek rests extending between the eye cutout and the mouth cutout. A cheek rest opening may extend between an inwardly most point of each of the pair of cheek rests. The bottom opening may have a first width and the cheek rest opening has a second width that is less than the first width. The bottom opening may have a first width and the cheek rest opening has a second width that is substantially equal to the first width. Each cheek rest may include a cheek rest relief surface formed in the upwardly facing concave surface. The cheek rest relief surface may be a concave surface having a radius of curvature that differs from a radius of curvature of the upwardly facing concave surface. A perimeter of each cheek rest relief surface may be defined by a portion of the respective curved inner edge of the eye cutout and a curved bottom relief edge.

It may be desired in any of the above aspects that the mouth cutout includes a pair of side mouth inner edges extending from the bottom opening. The pair of side mouth inner edges may be at least partially arcuate. The pair of side mouth inner edges may each include at least one planar side mouth inner edge. Each of the pair of side inner mouth edges may extend from the bottom outer edge of the outer perimeter. The outer perimeter may include a curved outer edge coupling the top outer edge and the pair of planar side outer edges.

According to a fifth aspect of the disclosed embodiments, a face rest shell for a head rest accessory includes an upwardly facing concave surface. A downwardly facing convex surface is opposite the upwardly facing concave surface. An outer perimeter has a partially circular top outer edge and a bottom outer edge. The outer perimeter includes a pair of planar side outer edges extending between the top outer edge and the bottom outer edge. A bottom opening is formed in the bottom outer edge. A cutout extends from the bottom opening. The cutout is configured to receive a patient's eyes, nose, mouth, and a central chin region of the patient's face when the patient is in a prone position on the head rest accessory. The cutout is defined by an inner edge. The cutout includes a mouth cutout extending from the opening and an eye cutout extending from the mouth cutout. The eye cutout is defined by a planar top inner edge and a pair of curved inner edges extending from the planar top inner edge. The concave surface and the convex surface extend between the outer edge of the cutout and the outer perimeter.

In some embodiments of the fifth aspect, the bottom outer edge may include a pair of planar bottom outer edges. The opening may be formed between the pair of bottom outer edges. Each of a pair of planar angled outer edges may extend between one of the pair of planar side outer edges and one of the planar bottom outer edges. The planar top inner edge of the eye cutout may extend substantially perpendicular to the pair of planar side outer edges of the outer perimeter. The planar top inner edge of the eye cutout may extend substantially parallel to each of the pair of planar bottom outer edges. The pair of curved inner edges of the eye cutout may be at least partially circular. The pair of curved inner edges of the eye cutout may be at least partially arcuate.

Optionally, in the fifth aspect, the face rest shell may include a pair of cheek rests extending between the eye cutout and the mouth cutout. A cheek rest opening may extend between an inwardly most point of each of the pair of cheek rests. The bottom opening may have a first width and the cheek rest opening has a second width that is less than the first width. The bottom opening may have a first width and the cheek rest opening has a second width that is substantially equal to the first width. Each cheek rest may include a cheek rest relief surface formed in the upwardly facing concave surface. The cheek rest relief surface may be a concave surface having a radius of curvature that differs from a radius of curvature of the upwardly facing concave surface. A perimeter of each cheek rest relief surface may be defined by a portion of the respective curved inner edge of the eye cutout and a curved bottom relief edge.

It may be desired in the fifth aspect that the mouth cutout includes a pair of side mouth inner edges extending from the bottom opening. The pair of side mouth inner edges may be at least partially arcuate. The pair of side mouth inner edges may each include at least one planar side mouth inner edge. Each of the pair of side inner mouth edges may extend from the bottom outer edge of the outer perimeter. The outer perimeter may include a curved outer edge coupling the top outer edge and the pair of planar side outer edges. The cutout may be generally T-shaped.

In some embodiments of any of the above aspects, the face rest shell may include at least one angle sensor attached to the face rest shell to indicate a tilt angle of the face rest shell. The at least one angle sensor may positioned along a side of the face rest shell and aligned with an eye cutout of the generally T-shaped cutout. The at least one angle sensor may measure a longitudinal tilt angle of the face rest shell. The at least one angle sensor may be positioned on a head end of the face rest shell on a centerline of the face rest shell extending between the head end and a chin end of the face rest shell. The at least one angle sensor may measure a lateral tilt angle of the face rest shell. The at least one angle sensor may include a first angle sensor positioned along a side of the face rest shell and aligned with an eye cutout of the generally T-shaped cutout to measure a longitudinal tilt angle of the face rest shell. A second angle sensor may be positioned on a head end of the face rest shell on a centerline of the face rest shell extending between the head end and a chin end of the face rest shell to measure a lateral tilt angle of the face rest shell.

Optionally, the at least one angle sensor may include a spirit level vial having a bubble that indicates the angle of the face rest shell. The at least one angle sensor may include a liquid level that indicates the angle of the face rest shell. The liquid level may include an artificial horizon inclinometer. The artificial horizon inclinometer may indicate one of a lateral tilt angle or a longitudinal tilt angle of the face rest shell. The artificial horizon inclinometer may indicate both of a lateral tilt angle and a longitudinal tilt angle of the face rest shell. The at least one angle sensor may include a plurality of markings indicative of an angle of the face rest shell.

It may be contemplated that the at least one angle sensor may facilitate setting a correct position of the face rest shell according a patient morphology. The at least one angle sensor may facilitate setting a correct position of the face rest shell before the patient's face is positioned in the face rest shell.

According to a sixth aspect of the disclosed embodiments, a head rest accessory is provided for coupling to a frame member at a head end of a pivotable torso support section of a hospital bed. The head rest accessory includes a frame configured to couple to the frame member so that the frame is cantilevered from the frame member. A head rest mount is coupled to the frame and is repositionable along the frame. A head rest is coupled to the head rest mount. The head rest includes a face rest shell having an upwardly facing concave surface and having a generally T-shaped cutout to receive a patient's eyes, nose, mouth, and a central chin region of the patient's face when the patient is in a prone position on the head rest accessory. A first angle sensor is positioned along a side of the face rest shell and aligned with an eye cutout of the generally T-shaped cutout to measure a first tilt angle of the face rest shell. A second angle sensor is positioned on a head end of the face rest shell on a centerline of the face rest shell extending between the head end and a chin end of the face rest shell to measure a second tilt angle of the face rest shell.

In some embodiments of the sixth aspect, the first tilt angle may include a longitudinal tilt angle. The second tilt angle may include a lateral tilt angle. At least one of the first angle sensor and the second angle sensor may include a spirit level vial having a bubble that indicates the angle of the face rest shell. At least one of the first angle sensor and the second angle sensor may include a liquid level that indicates the angle of the face rest shell. The liquid level may include an artificial horizon inclinometer. The artificial horizon inclinometer may indicate one of a lateral tilt angle or a longitudinal tilt angle of the face rest shell. The artificial horizon inclinometer may indicate both of a lateral tilt angle and a longitudinal tilt angle of the face rest shell. At least one of the first angle sensor and the second angle sensor may include a plurality of markings indicative of an angle of the face rest shell.

Optionally, in the sixth aspect, at least one of the first angle sensor and the second angle sensor may facilitate setting a correct position of the face rest shell according a patient morphology. At least one of the first angle sensor and the second angle sensor may facilitate setting a correct position of the face rest shell before the patient's face is positioned in the face rest shell.

According to a seventh aspect of the disclosed embodiments, a head rest accessory for coupling to a frame member at a head end of a pivotable torso support section of a hospital bed is provided. The head rest accessory includes a frame having a pair of rails that are spaced apart and substantially parallel and that extend from a distal end to a proximal end. A crossbeam is coupled to the distal ends of the pair of rails. A U-shaped connector is coupled to the proximal ends of a respective rail of the pair of rails. The U-shaped connector opens downwardly to permit the U-shaped connector to be insertable downwardly over the frame member to couple the frame to the pivotable torso support section so that the frame is cantilevered from the frame member. A head rest mount is coupled to the frame and extends between the pair of rails. The head rest mount has at least one releasable clamp that grips a corresponding one of the pair of rails to lock the head rest mount in place on the frame when the releasable clamp is in a locked condition. The head rest mount is repositionable along the pair of rails when the releasable clamp is in an unlocked condition. A head rest is coupled to the head rest mount. The head rest includes a face rest shell having an upwardly facing concave surface and having a generally T-shaped cutout to receive a patient's eyes, nose, mouth, and a central chin region of the patient's face when the patient is in a prone position on the head rest accessory.

In some embodiments of the seventh aspect, the crossbeam may extend orthogonal to each of the pair of rails. The U-shaped connector may extend perpendicular to the frame and may include a pair of flanges and a slot extending between the pair of flanges. Each of the pair of flanges may include a planar surface. The slot may be defined by the planar surfaces of the pair of flanges. Each of the pair of rails may have a rectangular cross-section taken in a vertical plane. Each of the pair of rails may include a loop configured to position over a base frame of the bed when the bed is in a Trendelenburg position. The U-shaped connector may include a pair of sockets. Each loop may include a post configured to be inserted into a respective socket. The posts may be removably inserted into each of the pair of sockets.

At least a portion of the U-shaped connector may include at least one of a plastic and composite.

Optionally, in the seventh aspect, the head rest mount may be repositionable along the pair of rails along a longitudinal axis of the hospital bed. The head rest mount may include a base that is repositionable along the pair of rails. The base may include a track and a body repositionable along the track in a direction perpendicular to the longitudinal axis of the hospital bed. A post may extend vertically from the body. A mount rail may extend from the post and repositionable vertically along the post. The head rest may be coupled to a cantilevered end of the rail. The head rest may be rotatable about the mount rail in a first rotational direction to roll the head rest. The head rest may be rotatable about the mount rail in a second rotational direction to pitch the head rest. The head rest may be rotatable about the mount rail in a third rotational direction to yaw the head rest.

It may be desired, in the seventh aspect, that the face rest shell includes a downwardly facing convex surface opposite the upwardly facing concave surface. An outer perimeter may have a partially circular top outer edge and a bottom outer edge. The outer perimeter may include a pair of planar side outer edges extending between the top outer edge and the bottom outer edge. A bottom opening may be formed in the bottom outer edge. The generally T-shaped cutout may extend from the bottom opening. The generally T-shaped cutout may be defined by an inner edge. The generally T-shaped cutout may include a mouth cutout extending from the opening and an eye cutout extending from the mouth cutout. The eye cutout may be defined by a planar top inner edge and a pair of curved inner edges extending from the planar top inner edge. The concave surface and the convex surface may extend between the inner edge of the cutout and the outer perimeter. The face rest shell may include relief cutouts around the eye cutout to facilitate distributing interface pressure from protruding facial features of the patient. The face rest shell may include a top wall extending from the top outer edge. A pair of side walls may be provided. Each of the pair of side walls may extend from one of the pair of planar side outer edges. A face cushion may be positioned on the concave surface of the face rest shell and may be retained in the concave surface of the face rest shell by the top wall and the pair of side walls. The face cushion may include a surface that is sized and shaped to the patient's face. The face cushion may include a generally T-shaped cutout to receive a patient's eyes, nose, mouth, and a central chin region of the patient's face when the patient is in a prone position on the head rest accessory.

In some embodiments of the seventh aspect, the face rest shell may include at least one angle sensor attached to the face rest shell to indicate a tilt angle of the face rest shell. The at least one angle sensor may be positioned along a side of the face rest shell and aligned with an eye cutout of the generally T-shaped cutout. The at least one angle sensor may measure a longitudinal tilt angle of the face rest shell. The at least one angle sensor may be positioned on a head end of the face rest shell on a centerline of the face rest shell extending between the head end and a chin end of the face rest shell. The at least one angle sensor may measure a lateral tilt angle of the face rest shell.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
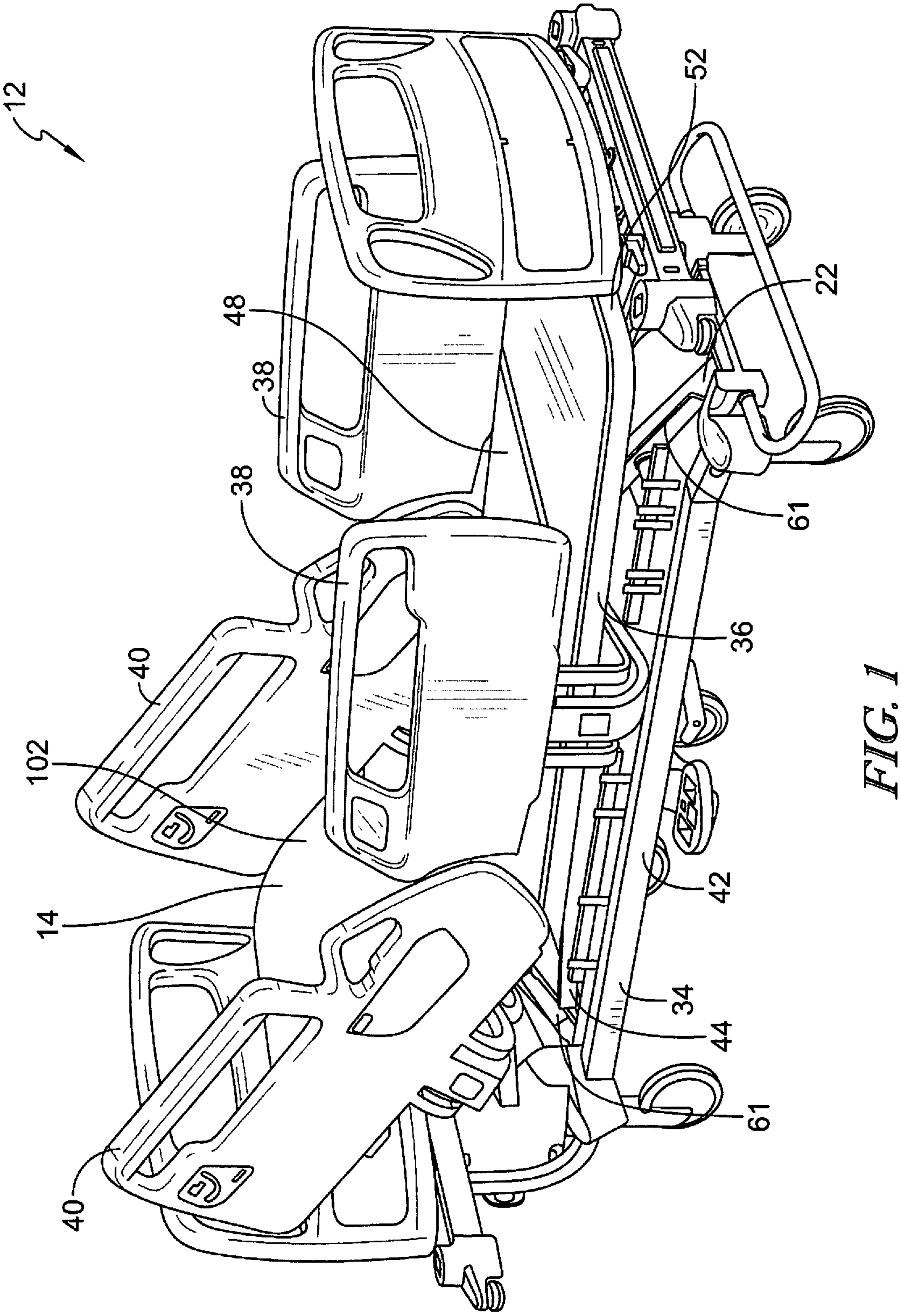
FIG. 1 is a perspective view of a patient support apparatus illustrated as a hospital bed.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a patient support apparatus 12 includes a base 34 and a deck 36 that support a patient support surface 14 above the floor. The base 34 is configured to raise and lower the deck 36 relative to the floor to raise and lower the patient support surface 14 relative to the floor. The deck 36 is articulatable and may be reconfigured to support a patient on the patient support surface 14 in a variety of positions, for example in a lie-flat position or a sit-up position (shown in FIG. 1). The patient support apparatus 12 also includes siderails 38 and headrails 40 coupled to the deck 36 to block a patient from accidentally rolling off of the patient support system 12.

The base 34 illustratively includes a lower frame 42, an upper frame 44, and a lift system 22. The lift system 22 is illustratively coupled between the lower frame 42 and the upper frame 44 to raise and lower the upper frame 44 relative to the lower frame 42. The lift system 22 illustratively includes lift arms 61 that pivot relative to the lower frame 42 and the upper frame 44 to raise and lower the upper frame 44 relative to the lower frame 42.

The deck 36 illustratively includes a torso support section 102, a seat-deck section 48, and a foot-deck section 52. The torso support section 102 is mounted to the upper frame 44 to pivot about an axis relative to the seat-deck section 48. The seat-deck section 48 is coupled to the upper frame 44 to move with the upper frame 44. The foot-deck section 52 is coupled to the seat-deck section 48 to pivot relative to the seat-deck section 48. The foot-deck section 52 is also extendable and retractable to lengthen or shorten the deck 36 as desired by a caregiver or to accommodate repositioning of the deck 36.

Figure 2:
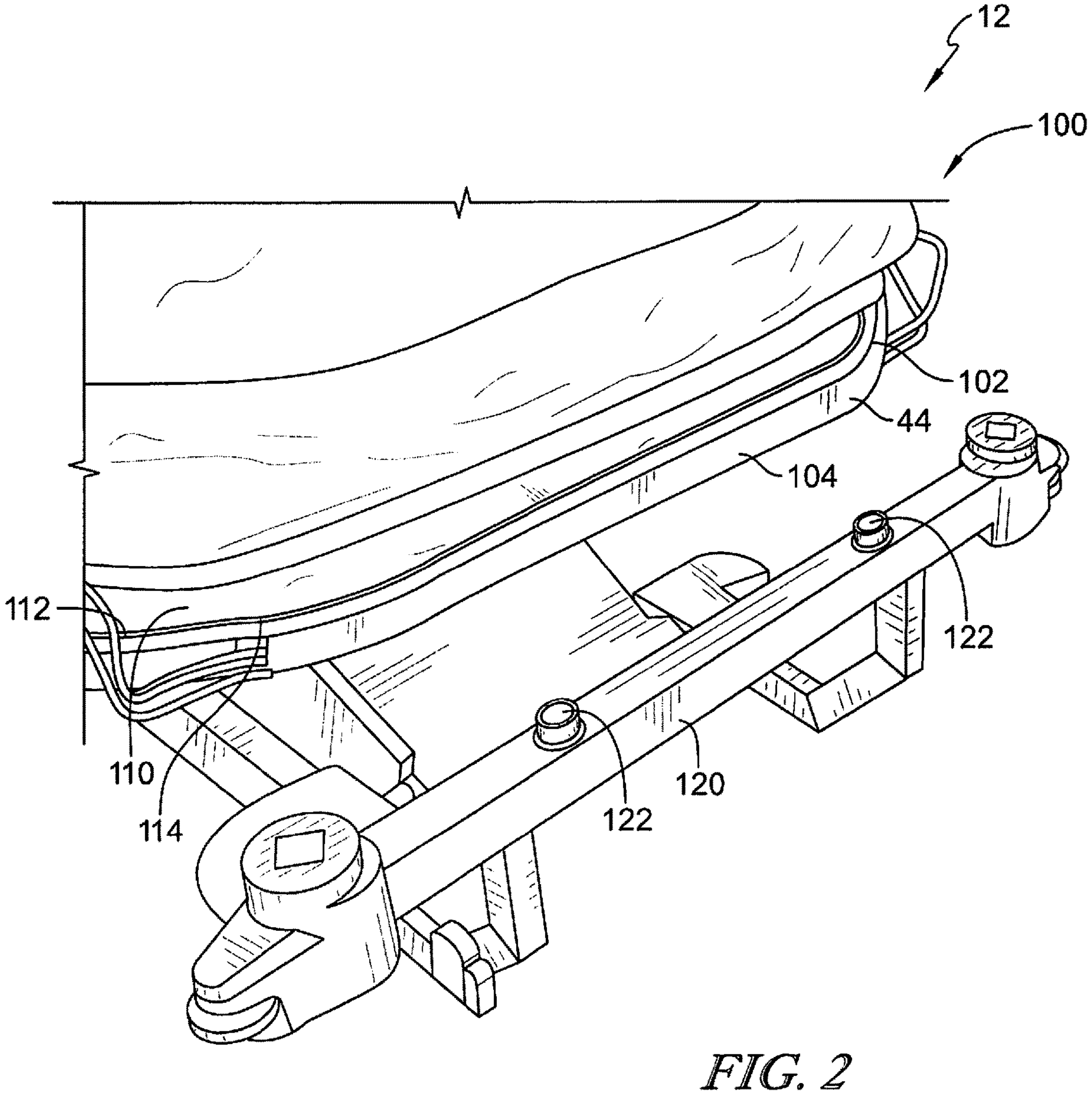
FIG. 2 is a head end view of the patient support apparatus shown in FIG. 1.

Referring to FIG. 2, the apparatus 12 includes the upper frame 44 at a head end 100 of a pivotable torso support section 102. The upper frame 44 includes a crossbar 104 that is generally rectangular in shape. The crossbar 104 extends along the head end 100 of the support section 102. A panel 110 is positioned in the upper frame 44 and includes a head end 112 that extends along the crossbar 104. The panel 110 is spaced from the crossbar 104 to create a slot 114 between the head end 112 of the panel 110 and the crossbar 104, in some embodiments. In other embodiments, the panel 110 includes cutout (not shown) to create the slot 114 between the head end 112 of the panel 110 and the crossbar 104. A lower frame member 120 is positioned below the frame 44. The lower frame member 120 is positioned outward in a head end direction from the crossbar 104. The lower frame member 120 includes sockets 122 for attaching accessories to the apparatus 12.

Figure 3:
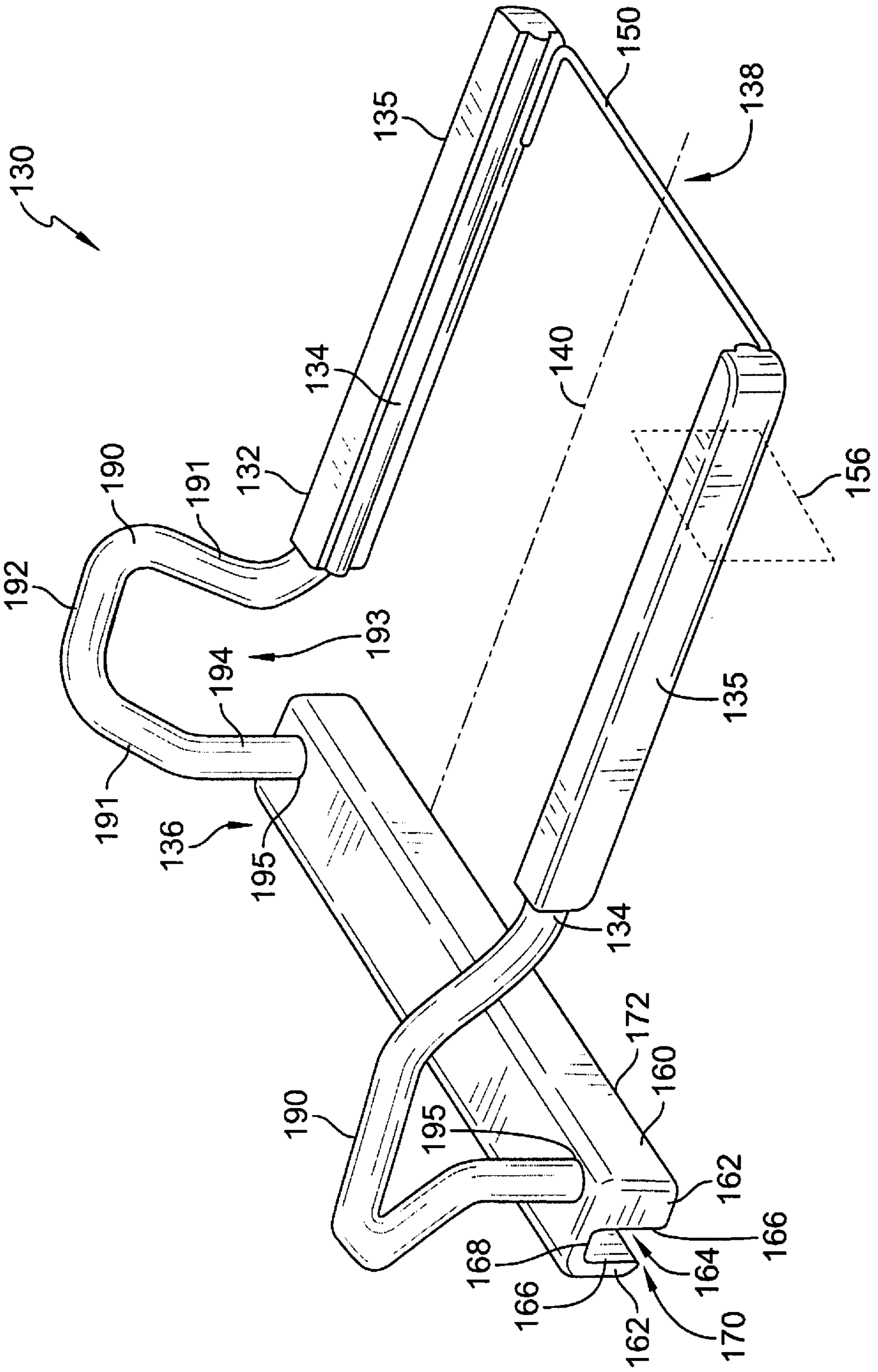
FIG. 3 is a perspective view of a head rest accessory formed in accordance with an embodiment.

Referring now to FIG. 3, a head rest accessory 130 includes a frame 132 having a pair of rails 134 that extend from a proximal end 136 to a distal end 138. The frame 132 is a substantially C-shaped frame 132 and the pair of rails 134 extend substantially parallel to one another along a respective longitudinal axis 140. A crossbeam 150 extends between and is coupled to each of the pair of rails 134 at the distal end 138. In the illustrated embodiment, the crossbeam 150 is configured as a rod. The crossbeam 150 extends orthogonal to the longitudinal axis 140 of each of the pair of rails 134. That is, the crossbeam 150 extends perpendicular to the longitudinal axis 140 of each of the pair of rails 134. Each rail 134 includes a rectangular member 135 that is formed from a plastic or composite. In some embodiments, the members 135 may be formed from metal or any other suitable material. In some embodiments, the members 135 have a relatively rectangular cross-section in a vertical plane 156. In other embodiments, the members 135 may have any suitable cross-section. In some embodiments, the cross-sectional shape of the members 135 is in accordance with the longitudinal frame members of the Allen Advance® Table. In some embodiments, the members 135 have the dimensions of approximately 1.5 inches (about 3.81 centimeters) high and approximately 1.25 inches (about 3.175 centimeters) wide. In some embodiments, the spacing between the members 135 is approximately 14.5 inches (about 36.83 centimeters).

A U-shaped connector 160 extends between the proximal end 136 of each rail 134. The connector 160 extends orthogonal to each of the rails 134. That is, the connector 160 extends substantially perpendicular to the rails 134. The connector 160 includes a pair of spaced apart flanges 162 that define a slot 164 between the flanges 162. Each flange 162 includes a planar surface 166 facing inwardly to define a respective surface of the slot 164. The planar surface 166 extends from an end wall 168 of the slot 164 to an opening 170 of the slot 164. In some embodiments, at least a portion of the connector 160 is formed from a plastic or composite. For example, an inner portion 168 of each flange 162 that forms the planar surfaces 166 and the end wall 168 may be formed from a plastic or composite. In some embodiments, the entire connector 160 is formed from a plastic or composite. The slot 164 opens downwardly so that the opening 170 is positioned at a bottom end 172 of the connector 162 and the end wall 168 is positioned above the opening 170. The slot 164 extends substantially orthogonally from the longitudinal axis 140 of each rail 134. More specifically, the slot 164 extends perpendicular to the longitudinal axis 140 of each rail 134. The connector 160 is configured to be insertable downwardly over the crossbeam 104 to couple the head rest accessory 130 to the pivotable torso support section 102.

Each rail 134 includes a loop configuration 190 at the proximal end 136. The loop configuration 190 includes a pair of outwardly and upwardly extending members 191. Each of the members 191 is coupled together by an upper rail 192. The upper rail 192 extends substantially parallel to the respective rail 134. The upper rail 192 is positioned above the respective rail 134 so that a space 193 is defined in the loop configuration 190. A post 194 extends downwardly from each loop configuration 190. The connector 160 includes a pair of sockets 195 that are each configured to receive one of the posts 194 so that the rails 134 are coupled to the connector 160. In some embodiments, the rails 134 are removably coupled to the connector 160. That is, the posts 194 are removable from the sockets 195 to disconnect the rails 134 from the connector 160. In this way, the rails 134 may be removed to allow room for various accessories without removing the connector 160 from the apparatus 12.

Figure 4:
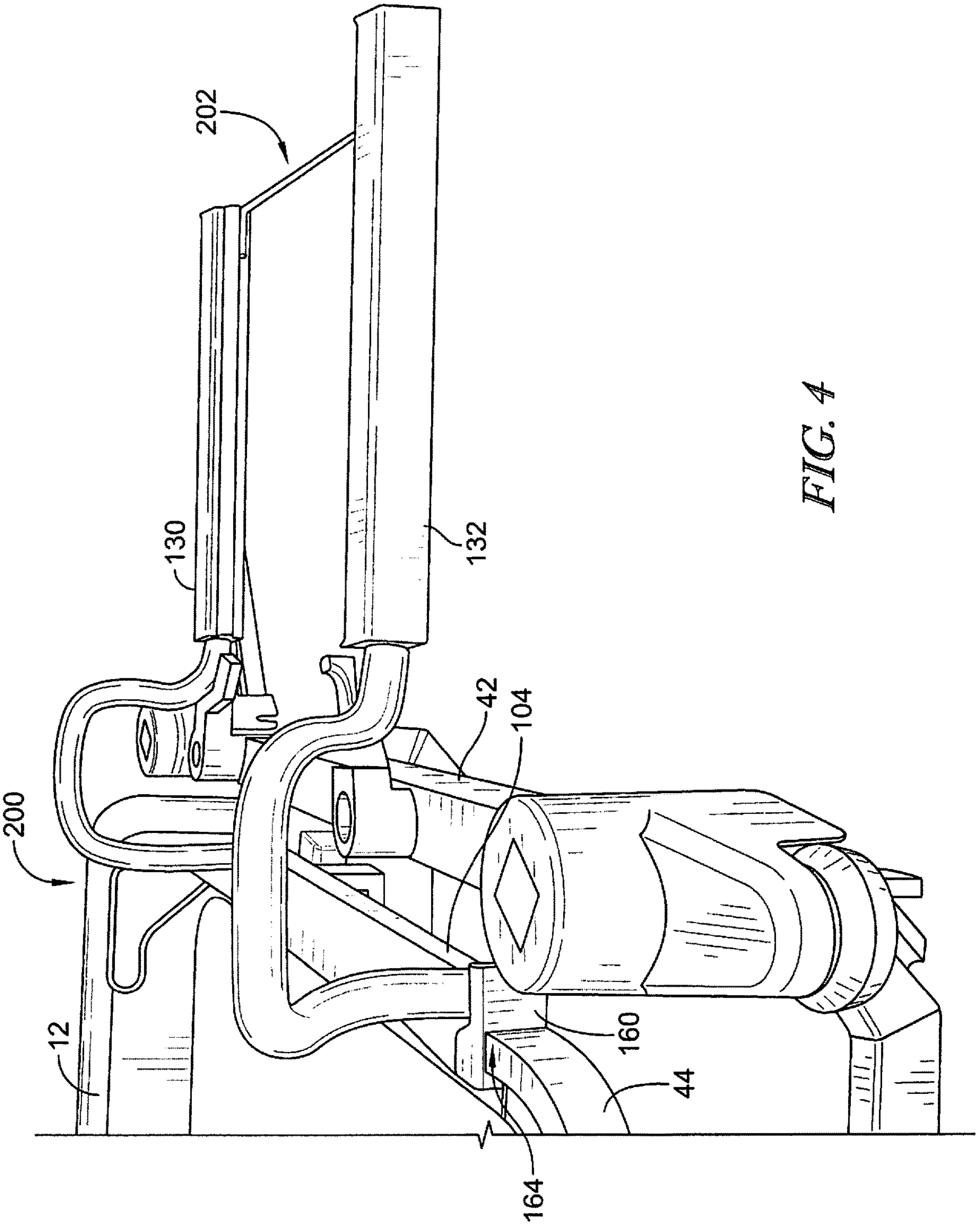
FIG. 4 is a perspective view of the head rest accessory shown in FIG. 3 coupled to the patient support apparatus shown in FIG. 1.

Referring now to FIG. 4, the head rest accessory 130 is illustrated coupled to the crossbar 104 of the apparatus 12. The connector 160 of the head rest accessory 130 is positioned downwardly onto the crossbar 104 of the upper frame 44 so that the crossbar 104 is received within the slot 164 of the connector 160. The head rest accessory 130 is coupled to the crossbar 104 so that the head rest accessory 130 extends between a fixed end 200 and a cantilevered end 202. The fixed end 200 is positioned at the crossbar 104 where the connector 160 is inserted over the crossbar 104. The cantilevered end 202 extends outward from the crossbar 104 past an end of the apparatus 12. The head rest accessory 130 extends from the crossbar 104 such that the head rest accessory 130 is held in a fixed position with limited give or sway at the cantilevered end 202. That is, the head rest accessory 130 is held substantially firmly to the crossbar 104.

Figure 9:
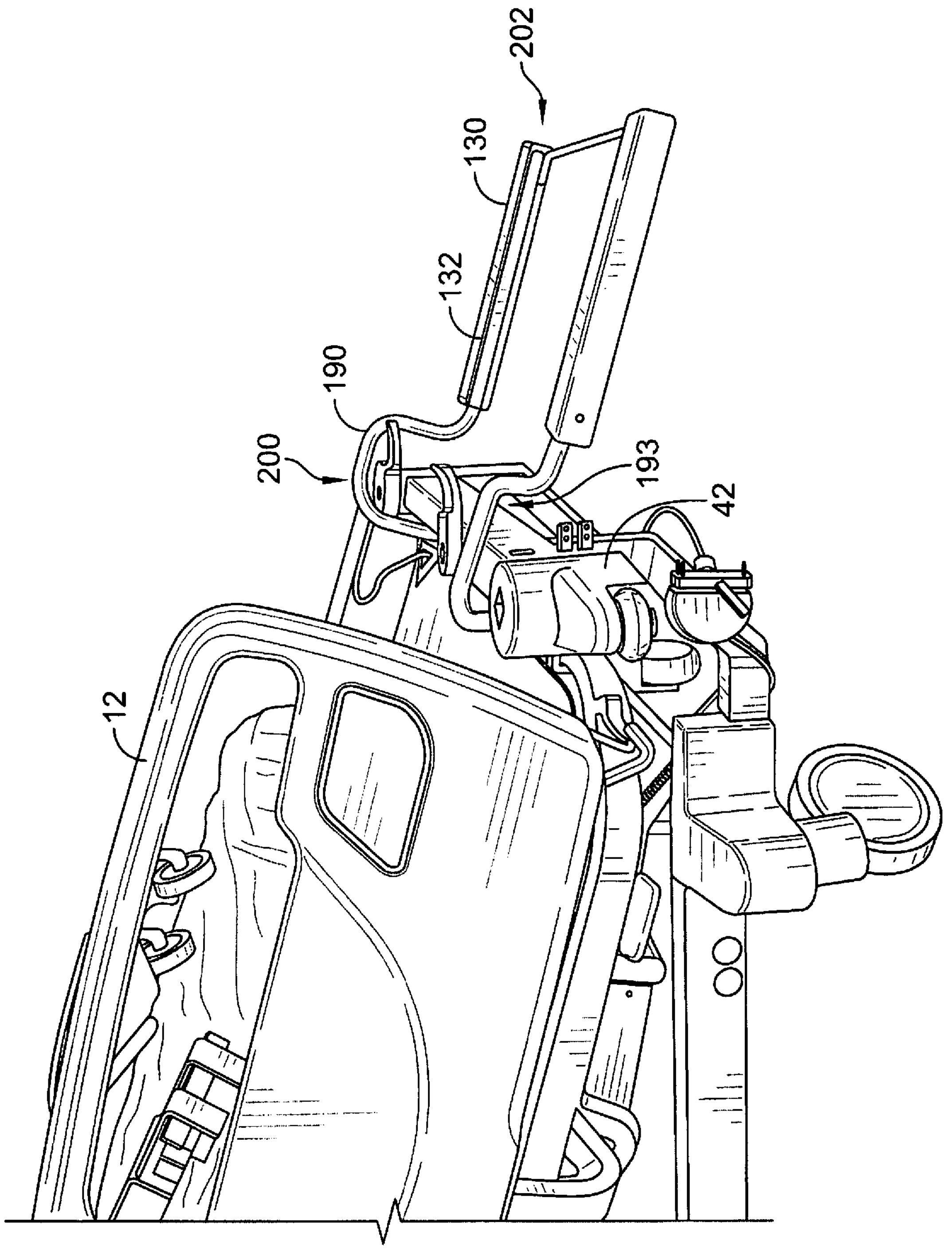
FIG. 9 is a perspective view of the head rest accessory shown in FIG. 3 coupled to the patient support apparatus shown in FIG. 1 with the patient support apparatus in a Trendelenburg position.

As illustrated in FIG. 4, the head rest accessory 130 is coupled to the crossbar 104 so that a clearance space is provided between the frame 132 of the head rest accessory 130 and the lower frame 42 of the apparatus 12. Accordingly, when the head rest accessory 130 is coupled to the crossbar 104, the frame 132 of the head rest accessory 130 can extend above and across the lower frame 42 from the fixed end 200 to the cantilevered end 202. As illustrated in FIG. 9, when the apparatus 12 is positioned in the Trendelenburg position, the frame 132 tilts and is angled downward from the fixed end 200 to the cantilevered end 202. In this position, the space 193 in the loop configuration 190 of the frame 132 provides clearance for the lower frame 42 of the apparatus 12. That is, the lower frame 42 of the apparatus 12 nests within the space 193 so that the head rest accessory 130 is usable with the apparatus 12 in the Trendelenburg position without the head rest accessory 130 contacting the lower frame 42.

Figure 5:
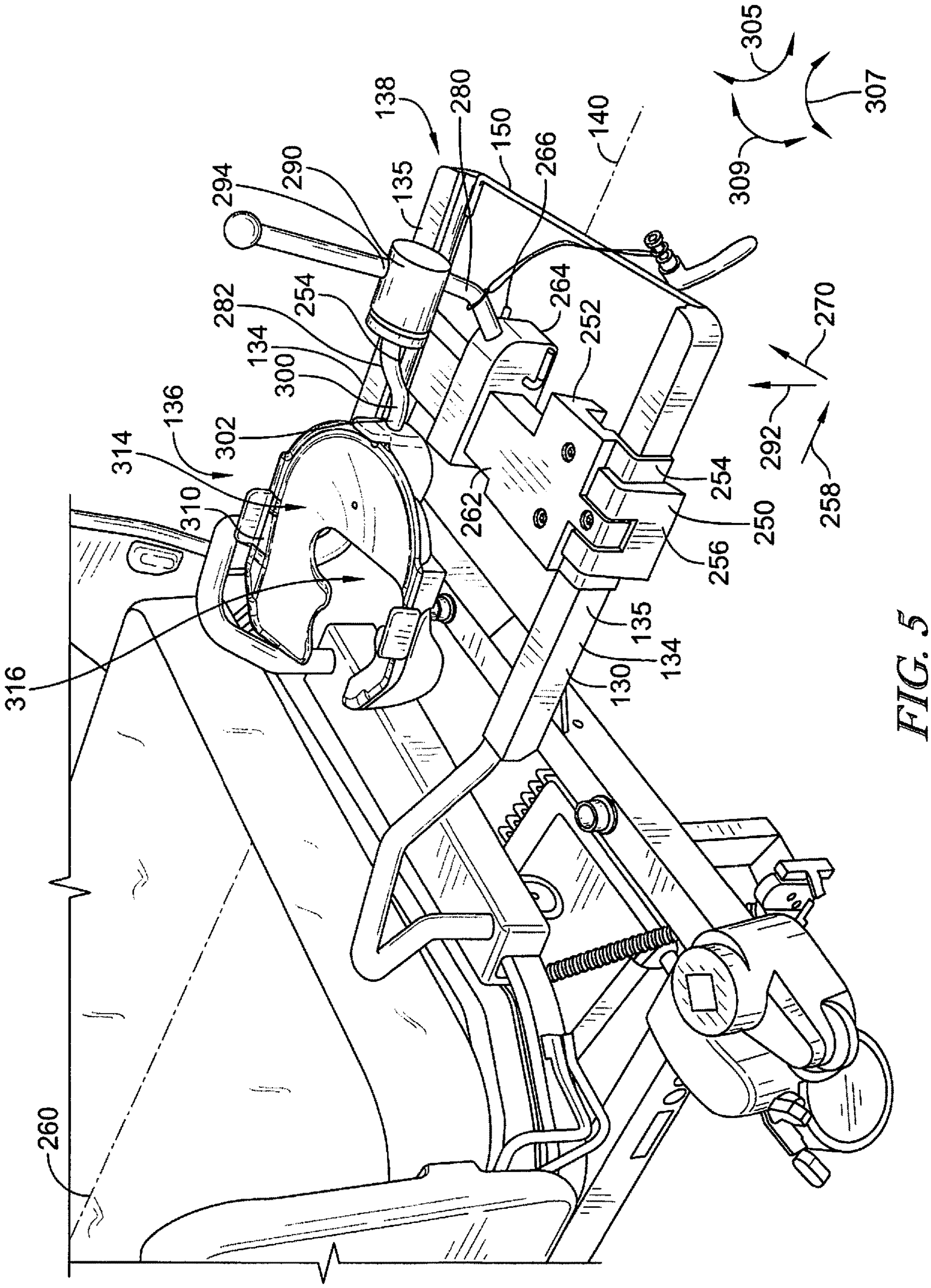
FIG. 5 is a perspective view of the head rest accessory shown in FIG. 3 having a head rest mount and face rest shell coupled thereto.

Referring now to FIG. 5, a head rest mount 250 is coupled between the rails 134 of the accessory 130. In the illustrated embodiment, the head rest mount 250 is coupled to the members 135 of the rails 134. In some embodiments, the head rest mount 250 is the same as the accessory described in U.S. Pat. No. 7,520,007, which is incorporated by reference herein in its entirety. The head rest mount 250 includes a base 252 having a pair of ends 254. Each end 254 includes a releasable clamp 256 that can be secured to one of the rails 134. When each clamp 256 is in an unlocked condition, the mount 250 is repositionable along the rails 134. That is, the mount 250 is repositionable in a first dimension 258 along the longitudinal axes 140 of the rails 134. Additionally, the mount 250 is repositionable in the first dimension 258 along a longitudinal axis 260 of the apparatus 12. In the first dimension 258, the mount 250 is moveable away from or toward the crossbeam 150 of the frame 132. That is, the mount 250 is repositionable in the first dimension between the proximal end 136 and the distal end 138 of the frame 132. In a locked condition, the clamps 256 prevent movement of the mount 250 so that the mount 250 is locked in position relative to the rails 134.

The base 252 includes a track 262 that extends between the ends 254. A body 264 is secured to the track 262 and repositionable along the track 262. The body 264 includes a lock 266 that secures the body 264 to the track 262. When the lock 266 is in an unlocked condition, the body 264 is repositionable along the track 262 in a second dimension 270 that is perpendicular to the longitudinal axes 140 of the rails 134. The second dimension 270 is also perpendicular to the longitudinal axis 260 of the apparatus 12. In the second dimension 270, the body 264 is repositionable between the rails 134 so that the body 264 may be moved toward one of the rails 134 while being moved away from the other rail 134. When the lock 266 is in a locked condition, the lock 266 prevents movement of the body 264 along the track 262.

A mount post 280 extends vertically from the body 264 and is repositionable with the body 264. The mount post 280 extends substantially perpendicular to the longitudinal axes 140 of the rails 134. The mount post 280 also extends substantially perpendicular to the longitudinal axis 260 of the apparatus 12. A mount rail 282 extends substantially perpendicular from the mount post 180. The mount rail 282 extends substantially parallel to the longitudinal axes 140 of the rails 134 and the longitudinal axis 260 of the apparatus 12. The mount rail 282 extends in a proximal direction toward the proximal end 136 of the frame 132.

The mount rail 282 includes a body 290 that is repositionable along the mount post 280 in a third vertical dimension 292. A lock 294 secures the body 290 to the mount post 280. When the lock 294 is in an unlocked condition, the body 290 moves along the mount post 280 in the third dimension so that the body 290 is raised or lowered relative to the frame 132 of the accessory 130. The third dimension 292 is perpendicular to both the first dimension 258 and the second dimension 270. That is, the first dimension 258 and second dimensions 270 are positioned in a horizontal plane, and the third dimension 292 is positioned in a vertical plane. When the lock 294 is in a locked condition, the lock 294 prevents the body 290 from moving relative to the mount post 280.

Figure 8:
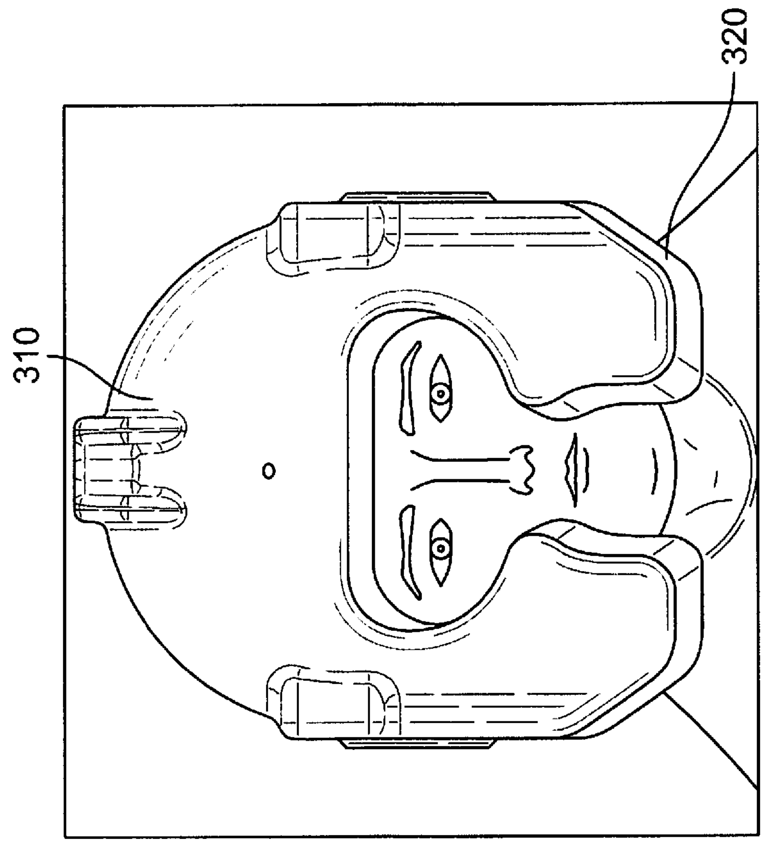
FIG. 8 is a front view of a patient's face positioned in the face cushion shown in FIG. 7, wherein the face cushion is positioned in the face rest shell shown in FIG. 5.

The mount rail 282 also includes a rod 300 that extends from the body 290 substantially perpendicular to both the longitudinal axes 140 of the rails 134 and the longitudinal axis 260 of the apparatus 12. The rod 300 extends from the body 290 toward the proximal end 136 of the frame 132. The rod 300 includes a cantilevered end 302. A face rest shell 310 is coupled to the cantilevered end 302. By moving the components of the head rest mount 250 as described above, the face rest shell 310 is movable in the first dimension 258, the second dimension 270, and the third dimension 292. Additionally, the cantilevered end 302 includes a ball joint (not shown). The face rest shell 310 is coupled to the ball joint to enable the face rest shell 310 to pitch in the rotational direction 305, yaw in the rotational direction 307, and roll in the rotational direction 309. The face rest shell 310 includes an upwardly facing concave surface 314. The face rest shell 310 also includes a generally T-shaped cutout 316 to receive a patient's eyes, nose, mouth, and a central chin region of the patient's face when the patient is in a prone position on the head rest accessory 130, as illustrated in FIG. 8. Various embodiments, of the face rest shell 310 are described in more detail below in FIGS. 10-17.

Figure 6:
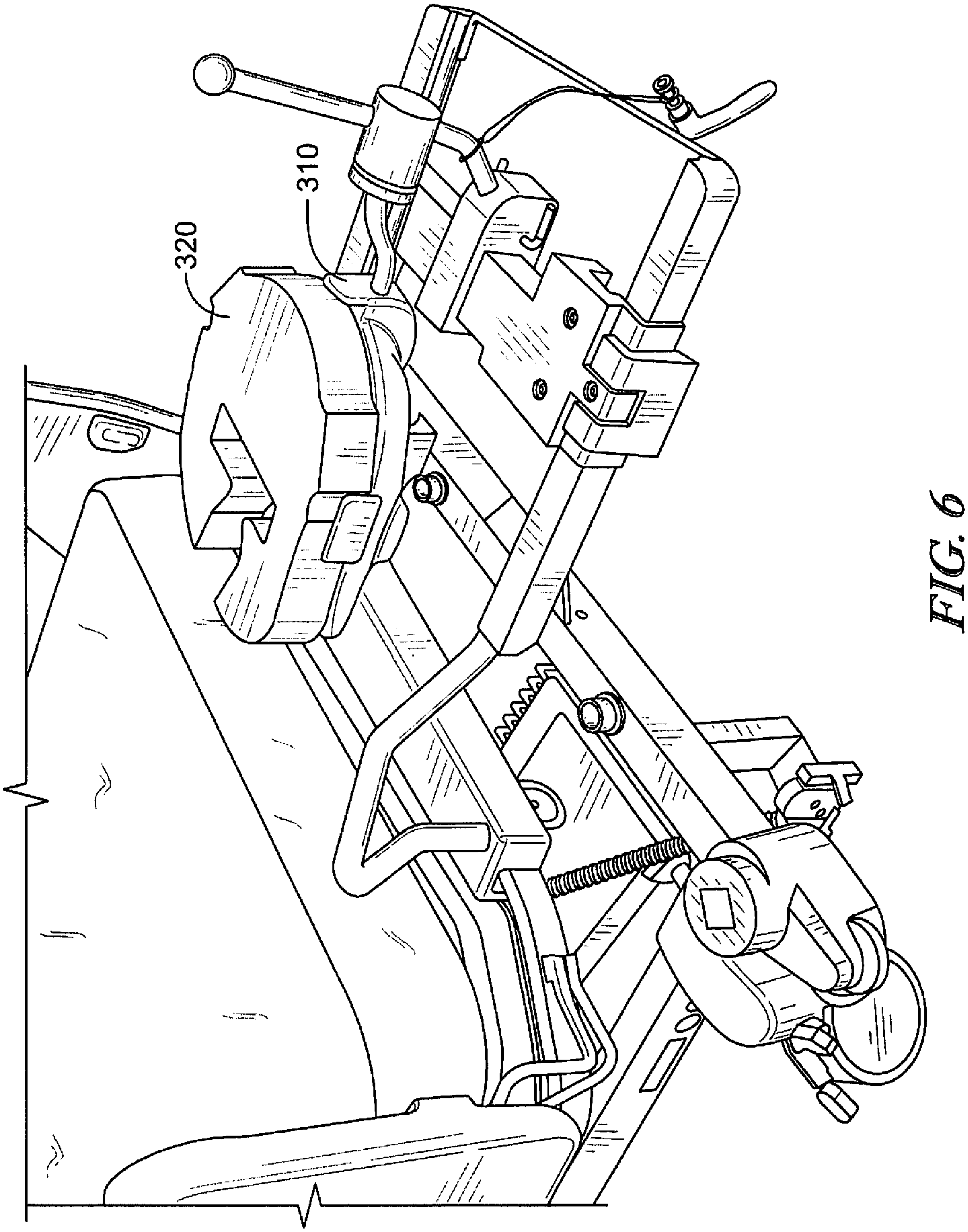
FIG. 6 is a perspective view of a face cushion positioned on the face rest shell shown in FIG. 5.
Figure 7:
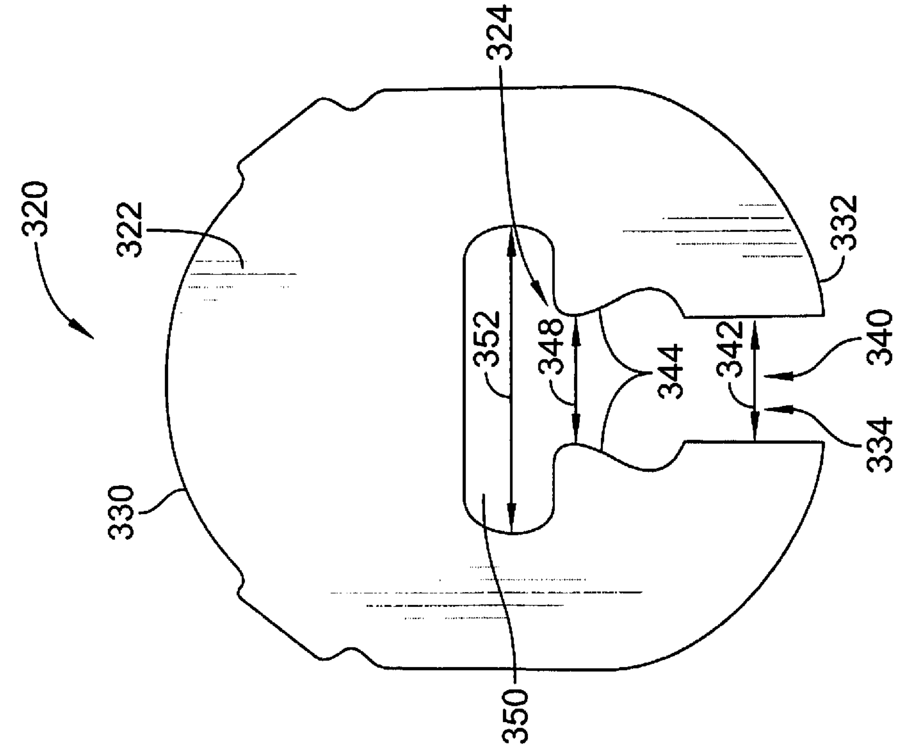
FIG. 7 is a front view of a face cushion formed in accordance with an embodiment.

The face rest shell 310 also includes a face cushion 320 that is positioned on the face rest shell 310, as illustrated in FIG. 6. Referring to FIG. 7, the face cushion 320 includes a surface 322 that is sized and shaped to the patient's face. The face cushion 320 also includes a generally T-shaped cutout 324 to receive a patient's eyes, nose, mouth, and a central chin region of the patient's face when the patient is in a prone position on the head rest accessory, as illustrated in FIG. 8.

Referring to FIG. 7, the face cushion 320 includes a top end 330 and a bottom end 332. The top end 330 is configured to receive the patient's forehead and the bottom end 332 is configured to receive the patient's chin. An opening 334 is formed in the bottom end 332. The cutout 324 extends from the opening 334 toward the top end 330. The cutout 324 includes a chin section 340 having a width 342 and configured to receive the patient's chin. A cheek bone relief section 344 extends from the chin section 340 and is defined by a pair of curved contours 346 that are shaped to the patient's cheek bones. The cheek bone relief section 344 extends a width 348 that is greater than the width 342. An eye section 350 extends from the cheek bone relief section 344 and has a width 352 that is greater than the width 348. The eye section 350 is generally oblong in shape and provides an opening for the patient's eye sockets.

Figure 10:
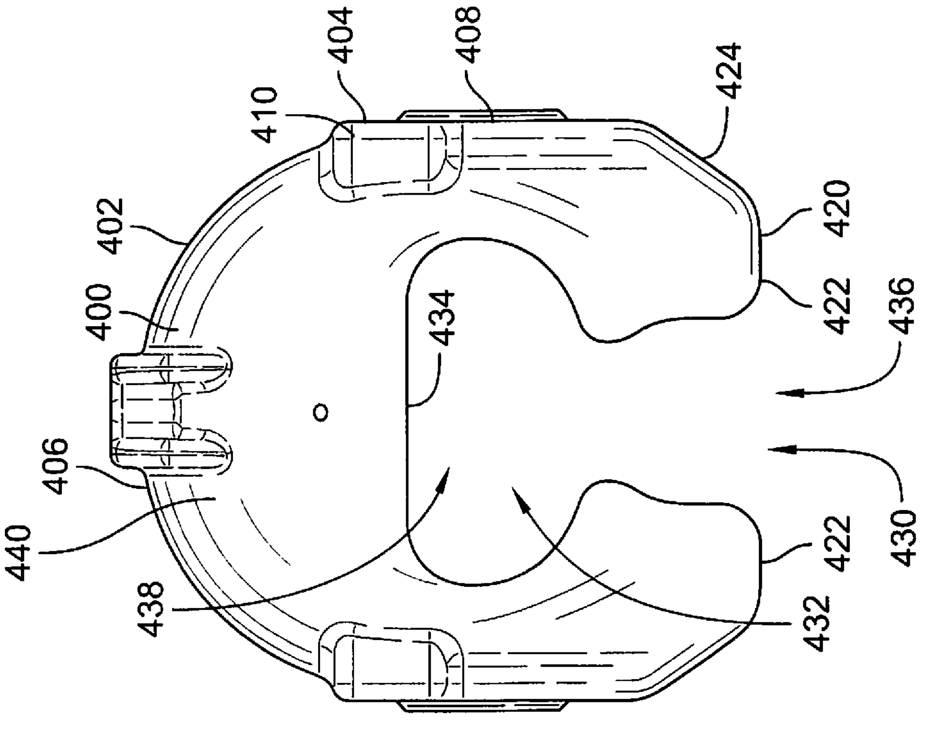
FIG. 10 is a front view of a face rest shell formed in accordance with an embodiment and showing a downwardly facing convex surface.

Referring now to FIG. 10, a face rest shell 400 includes an outer perimeter 402 defined by an outer edge 404. The outer edge 404 includes a top outer edge 406 and a pair of planar side outer edges 408. In the illustrative embodiment, the top outer edge 406 is partially circular. The top outer edge 406 is coupled to each of the side outer edges 408 by a respective curved outer edge 410. The side outer edges 408 extend between the top outer edge 406 and a bottom outer edge 420. The bottom outer edge 420 includes a pair of planar bottom outer edges 422. Each of the pair of planar bottom edges 422 is coupled to a respective side outer edge 408 by an angled outer edge 424. The planar bottom outer edges 422 extend substantially perpendicular to the pair of side outer edges 408.

An opening 430 is formed in the bottom outer edge 420. That is, the opening 430 is formed between the pair of planar bottom outer edges 422. A cutout 432 extends from the opening 430 toward the top outer edge 406. The cutout 432 is generally T-shaped and defined by an inner edge 434. The cutout 432 includes a mouth cutout 436 that extends from the opening 430. An eye cutout 438 extends from the mouth cutout 436 toward the top outer edge 406. A downwardly facing convex surface 440 extends between the outer edge 404 and the inner edge 434.

Figure 11:
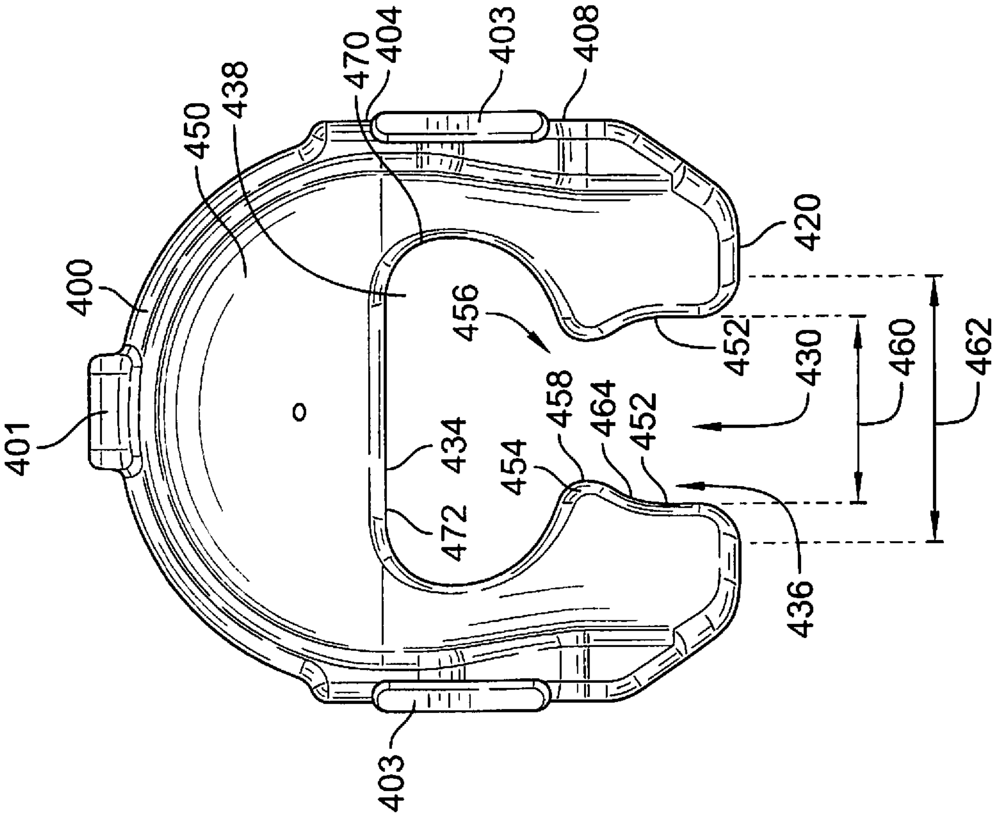
FIG. 11 is a rear view of the face rest shell shown in FIG. 10 and showing an upwardly facing concave surface.

Referring to FIG. 11, the face rest shell 400 includes an upwardly facing concave surface 450 extending between the outer edge 404 and the inner edge 434. The mouth cutout 436 includes a pair of side mouth inner edges 452 extending from the opening 430 to a cheek rest 454 that flares inward. The pair of side mouth inner edges 452 each include a plurality of side mouth inner edges 464, wherein at least one of the plurality of side mouth inner edges 464 is substantially arcuate. A cheek rest opening 456 is defined between an inwardly most point 458 of each of the cheek rests 454. In the illustrated embodiment, the cheek rest opening 456 has a width 460 that is less than a width 462 of the opening 430.

The eye cutout 438 extends from the mouth cutout 436. The eye cutout 438 extends from the cheek rest opening 456. The eye cutout 438 includes a pair of curved inner edges 470 that extend from the cheek rest opening 456 to a planar top inner edge 472. The pair of curved inner edge 470 are substantially arcuate. The top inner edge 472 extends substantially perpendicular to the side outer edges 408. The top inner edge 472 also extends substantially parallel to the bottom outer edge 420. Each cheek rest 454 is defined between the mouth cutout 436 and the eye cutout 438 so that each cheek rest 454 is defined at least partially by a respective side mouth inner edge 452 of the mouth cutout 436 and at least partially by a respective curved inner edge 470 of the eye cutout 438.

A top wall 401 extends from the top outer edge 406. In the illustrative embodiment, the top wall 401 extends upwardly from the upwardly facing concave surface 450. A pair of side walls 403 extend from the each of the planar side outer edges 408. In the illustrative embodiment, each of the pair of side walls 403 extends upwardly from the upwardly facing concave surface 450. The top wall 401 and the side walls 403 collectively retain the face cushion 320 on the upwardly facing concave surface 450.

Figure 12:
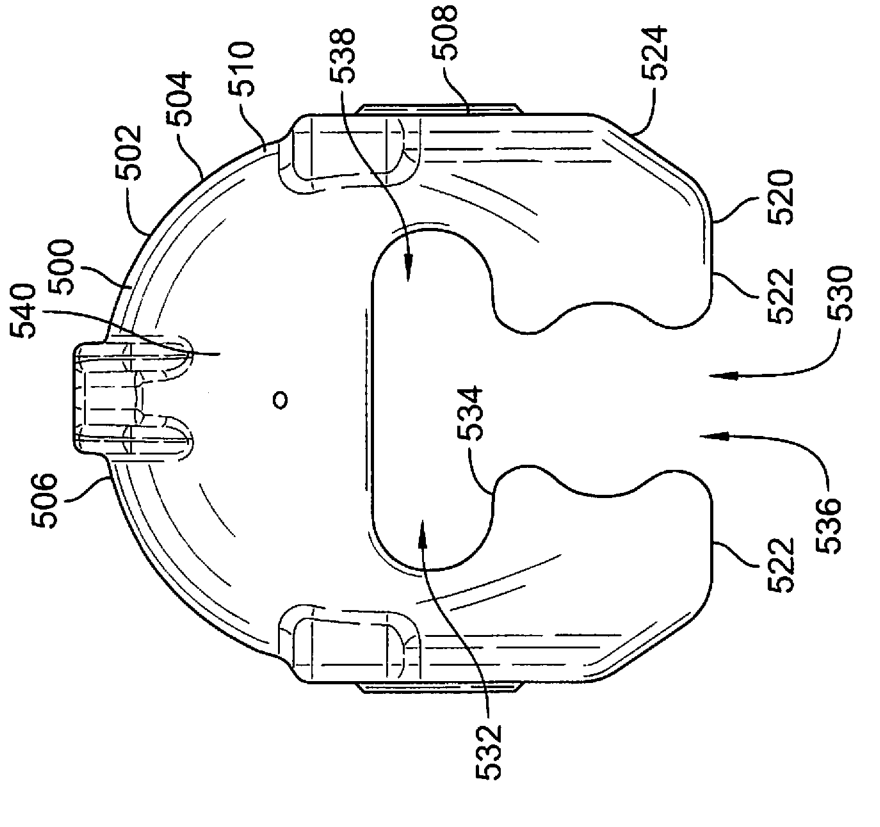
FIG. 12 is a front view of a face rest shell formed in accordance with another embodiment and showing a downwardly facing convex surface.

Referring now to FIG. 12, a face rest shell 500 includes an outer perimeter 502 defined by an outer edge 504. The outer edge 504 includes a top outer edge 506 and a pair of planar side outer edges 508. In the illustrative embodiment, the top outer edge 506 is partially circular. The top outer edge 506 is coupled to each of the side outer edges 508 by a respective curved outer edge 510. The side outer edges 508 extend between the top outer edge 506 and a bottom outer edge 520. The bottom outer edge 520 includes a pair of planar bottom outer edges 522. Each of the pair of planar bottom edges 522 is coupled to a respective side outer edge 508 by an angled outer edge 524. The planar bottom outer edges 522 extend substantially perpendicular to the pair of side outer edges 508.

An opening 530 is formed in the bottom outer edge 520. That is, the opening 530 is formed between the pair of planar bottom outer edges 522. A cutout 532 extends from the opening 530 toward the top outer edge 506. The cutout 532 is generally T-shaped and defined by an inner edge 534. The cutout 532 includes a mouth cutout 536 that extends from the opening 530. An eye cutout 538 extends from the mouth cutout 536 toward the top outer edge 506. A downwardly facing convex surface 540 extends between the outer edge 504 and the inner edge 534.

Figure 13:
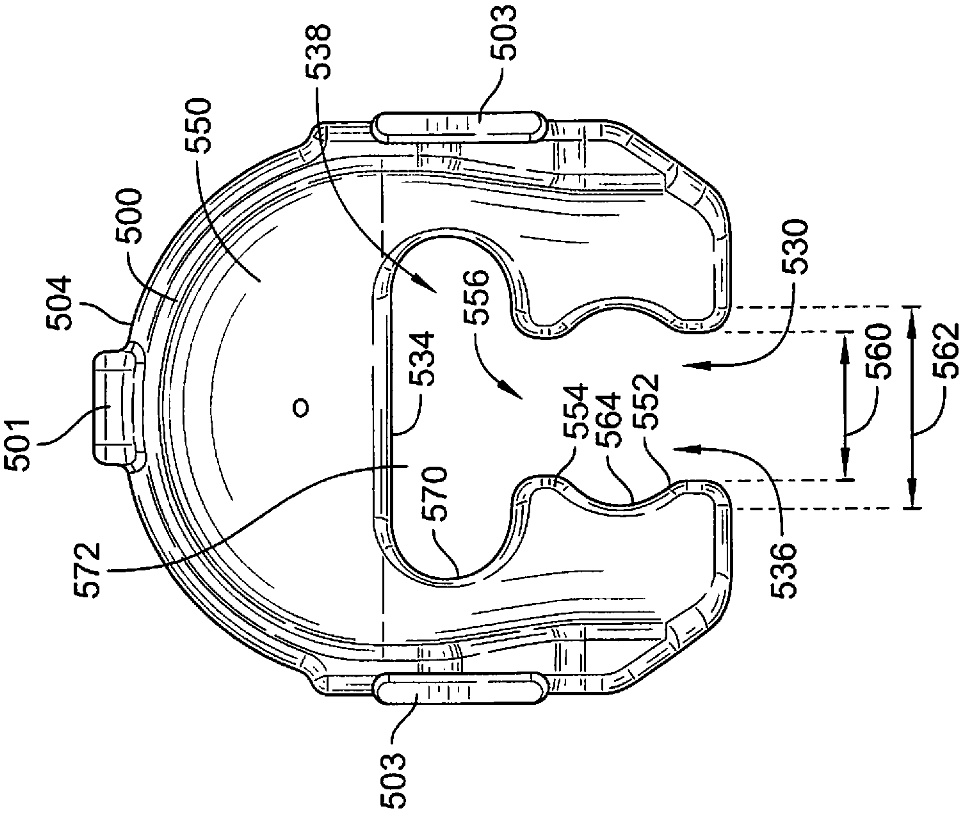
FIG. 13 is a rear view of the face rest shell shown in FIG. 12 and showing an upwardly facing concave surface.

Referring to FIG. 13, the face rest shell 500 includes an upwardly facing concave surface 550 extending between the outer edge 504 and the inner edge 534. The mouth cutout 536 includes a pair of side mouth inner edges 552 extending from the opening 530 to a cheek rest 554 that flares inward. The pair of side mouth inner edges 552 each include a plurality of side mouth inner edges 564, wherein at least one of the plurality of side mouth inner edges 564 is substantially circular. A cheek rest opening 556 is defined between an inwardly most point 558 of each of the cheek rests 554. In the illustrated embodiment, the cheek rest opening 556 has a width 560 that is substantially equal to a width 562 of the opening 530.

The eye cutout 538 extends from the mouth cutout 536. The eye cutout 538 extends from the cheek rest opening 556. The eye cutout 538 includes a pair of curved inner edges 570 that extend from the cheek rest opening 556 to a planar top inner edge 572. The pair of curved inner edge 570 are substantially circular. The top inner edge 572 extends substantially perpendicular to the side outer edges 508. The top inner edge 572 also extends substantially parallel to the bottom outer edge 520. Each cheek rest 554 is defined between the mouth cutout 536 and the eye cutout 538 so that each cheek rest 554 is defined at least partially by a respective side mouth inner edge 552 of the mouth cutout 536 and at least partially by a respective curved inner edge 570 of the eye cutout 538.

A top wall 501 extends from the top outer edge 506. In the illustrative embodiment, the top wall 501 extends upwardly from the upwardly facing concave surface 550. A pair of side walls 503 extend from the each of the planar side outer edges

508. In the illustrative embodiment, each of the pair of side walls 503 extends upwardly from the upwardly facing concave surface 550. The top wall 501 and the side walls 503 collectively retain the face cushion 520 on the upwardly facing concave surface 550.

Figure 14:
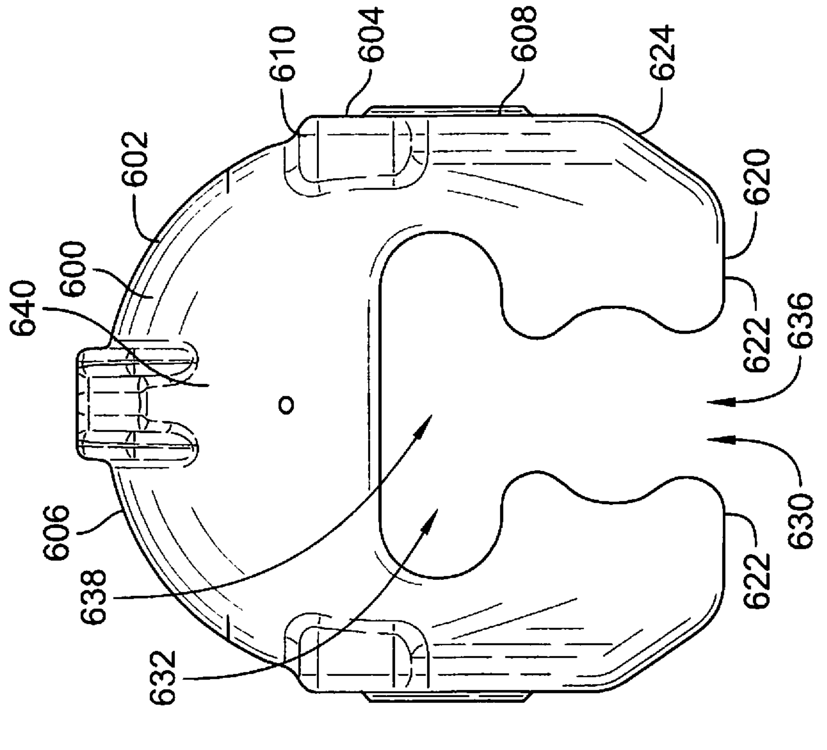
FIG. 14 is a front view of a face rest shell formed in accordance with yet another embodiment and showing a downwardly facing convex surface.

Referring now to FIG. 14, a face rest shell 600 includes an outer perimeter 602 defined by an outer edge 604. The outer edge 604 includes a top outer edge 606 and a pair of planar side outer edges 608. In the illustrative embodiment, the top outer edge 606 is partially circular. The top outer edge 606 is coupled to each of the side outer edges 608 by a respective curved outer edge 610. The side outer edges 608 extend between the top outer edge 606 and a bottom outer edge 620. The bottom outer edge 620 includes a pair of planar bottom outer edges 622. Each of the pair of planar bottom edges 622 is coupled to a respective side outer edge 608 by an angled outer edge 624. The planar bottom outer edges 622 extend substantially perpendicular to the pair of side outer edges 608.

An opening 630 is formed in the bottom outer edge 620. That is, the opening 630 is formed between the pair of planar bottom outer edges 622. A cutout 632 extends from the opening 630 toward the top outer edge 606. The cutout 632 is generally T-shaped and defined by an inner edge 634. The cutout 632 includes a mouth cutout 636 that extends from the opening 630. An eye cutout 638 extends from the mouth cutout 636 toward the top outer edge 606. A downwardly facing convex surface 640 extends between the outer edge 604 and the inner edge 634.

Figure 15:
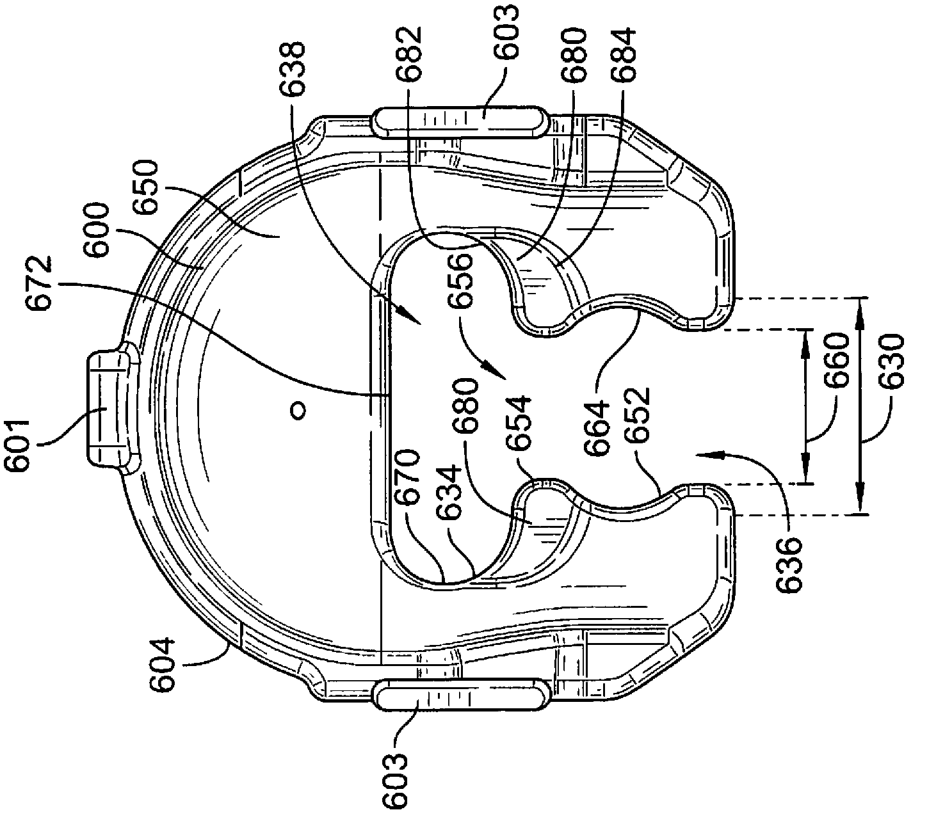
FIG. 15 is a rear view of the face rest shell shown in FIG. 14 and showing an upwardly facing concave surface.

Referring to FIG. 15, the face rest shell 600 includes an upwardly facing concave surface 650 extending between the outer edge 604 and the inner edge 634. The mouth cutout 636 includes a pair of side mouth inner edges 652 extending from the opening 630 to a cheek rest 654 that flares inward. The pair of side mouth inner edges 652 each include a plurality of side mouth inner edges 664, wherein at least one of the plurality of side mouth inner edges 664 is substantially circular. A cheek rest opening 656 is defined between an inwardly most point 658 of each of the cheek rests 654. In the illustrated embodiment, the cheek rest opening 656 has a width 660 that is substantially equal to a width 662 of the opening 630.

The eye cutout 638 extends from the mouth cutout 636. The eye cutout 638 extends from the cheek rest opening 656. The eye cutout 638 includes a pair of curved inner edges 670 that extend from the cheek rest opening 656 to a planar top inner edge 672. The pair of curved inner edge 670 are substantially circular. The top inner edge 672 extends substantially perpendicular to the side outer edges 608. The top inner edge 672 also extends substantially parallel to the bottom outer edge 620. Each cheek rest 654 is defined between the mouth cutout 636 and the eye cutout 638 so that each cheek rest 654 is defined at least partially by a respective side mouth inner edge 652 of the mouth cutout 636 and at least partially by a respective curved inner edge 670 of the eye cutout 638

Each cheek rest 654 includes a cheek rest relief surface 680 formed in the upwardly facing concave surface 650. The cheek rest relief surface 680 is a concave surface having a radius of curvature that differs from a radius of curvature of the upwardly facing concave surface 650. A perimeter 682 of each cheek rest relief surface 680 is defined by a portion of the respective curved inner edge 670 of the eye cutout 638 and a curved bottom relief edge 684. The cheek rest relief surface 680 is configured to reduce pressure on the patient's cheeks when the patient is positioned in a prone position on the face rest shell 600.

A top wall 601 extends from the top outer edge 606. In the illustrative embodiment, the top wall 601 extends upwardly from the upwardly facing concave surface 650. A pair of side walls 603 extend from the each of the planar side outer edges 608. In the illustrative embodiment, each of the pair of side walls 603 extends upwardly from the upwardly facing concave surface 650. The top wall 601 and the side walls 603 collectively retain the face cushion 620 on the upwardly facing concave surface 650.

Figure 16:
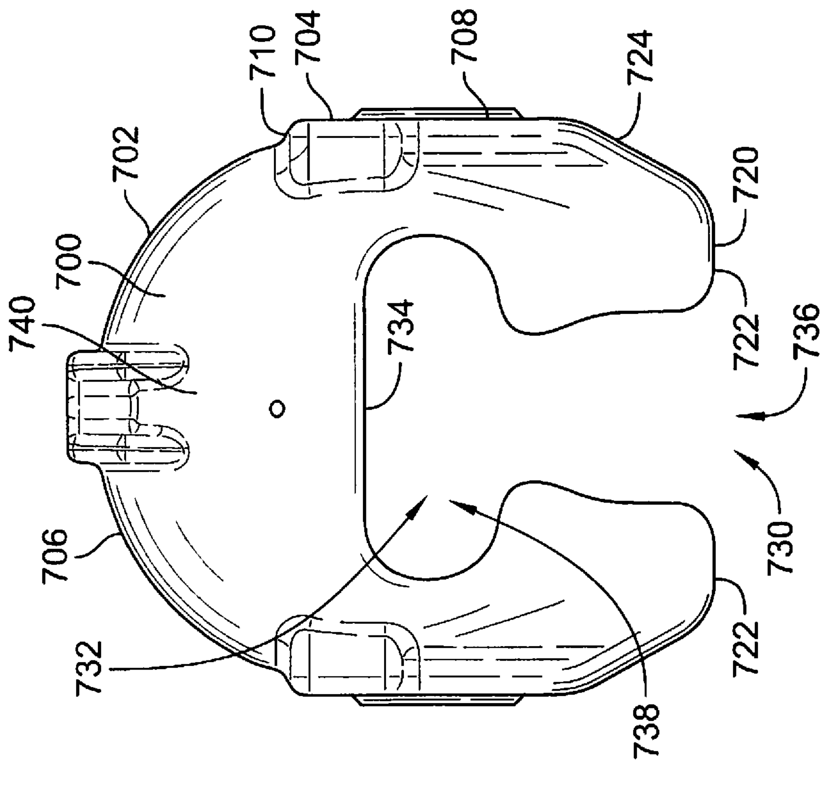
FIG. 16 is a front view of a face rest shell formed in accordance with a further embodiment and showing a downwardly facing convex surface.

Referring now to FIG. 16, a face rest shell 700 includes an outer perimeter 702 defined by an outer edge 704. The outer edge 704 includes a top outer edge 706 and a pair of planar side outer edges 708. In the illustrative embodiment, the top outer edge 706 is partially circular. The top outer edge 706 is coupled to each of the side outer edges 708 by a respective curved outer edge 710. The side outer edges 708 extend between the top outer edge 706 and a bottom outer edge 720. The bottom outer edge 720 includes a pair of planar bottom outer edges 722. Each of the pair of planar bottom edges 722 is coupled to a respective side outer edge 708 by an angled outer edge 724. The planar bottom outer edges 722 extend substantially perpendicular to the pair of side outer edges 708.

An opening 730 is formed in the bottom outer edge 720. That is, the opening 730 is formed between the pair of planar bottom outer edges 722. A cutout 732 extends from the opening 730 toward the top outer edge 706. The cutout 732 is generally T-shaped and defined by an inner edge 734. The cutout 732 includes a mouth cutout 736 that extends from the opening 730. An eye cutout 738 extends from the mouth cutout 736 toward the top outer edge 706. A downwardly facing convex surface 740 extends between the outer edge 704 and the inner edge 734.

Figure 17:
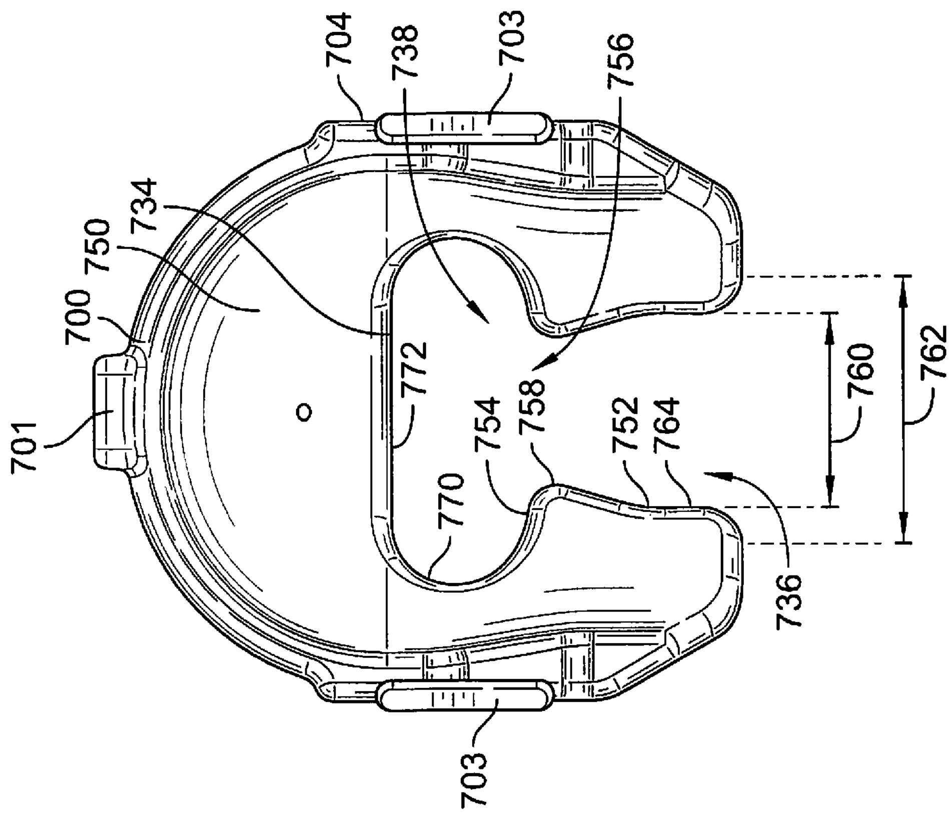
FIG. 17 is a rear view of the face rest shell shown in FIG. 16 and showing an upwardly facing concave surface.

Referring to FIG. 17, the face rest shell 700 includes an upwardly facing concave surface 750 extending between the outer edge 704 and the inner edge 734. The mouth cutout 736 includes a pair of side mouth inner edges 752 extending from the opening 730 to a cheek rest 754 that flares inward. The pair of side mouth inner edges 752 each include a plurality of side mouth inner edges 764, wherein at least one of the plurality of side mouth inner edges 764 is substantially planar. A cheek rest opening 756 is defined between an inwardly most point 758 of each of the cheek rests 754. In the illustrated embodiment, the cheek rest opening 756 has a width 760 that is less than a width 762 of the opening 730.

The eye cutout 738 extends from the mouth cutout 736. The eye cutout 738 extends from the cheek rest opening 756. The eye cutout 738 includes a pair of curved inner edges 770 that extend from the cheek rest opening 756 to a planar top inner edge 772. The pair of curved inner edge 770 are at least partially circular. The top inner edge 772 extends substantially perpendicular to the side outer edges 708. The top inner edge 772 also extends substantially parallel to the bottom outer edge 720. Each cheek rest 754 is defined between the mouth cutout 736 and the eye cutout 738 so that each cheek rest 754 is defined at least partially by a respective side mouth inner edge 752 of the mouth cutout 736 and at least partially by a respective curved inner edge 770 of the eye cutout 738.

A top wall 701 extends from the top outer edge 706. In the illustrative embodiment, the top wall 701 extends upwardly from the upwardly facing concave surface 750. A pair of side walls 703 extends from the each of the planar side outer edges 708. In the illustrative embodiment, each of the pair of side walls 703 extends upwardly from the upwardly facing concave surface 750. The top wall 701 and the side walls 703 collectively retain the face cushion 720 on the upwardly facing concave surface 750.

Figure 18:
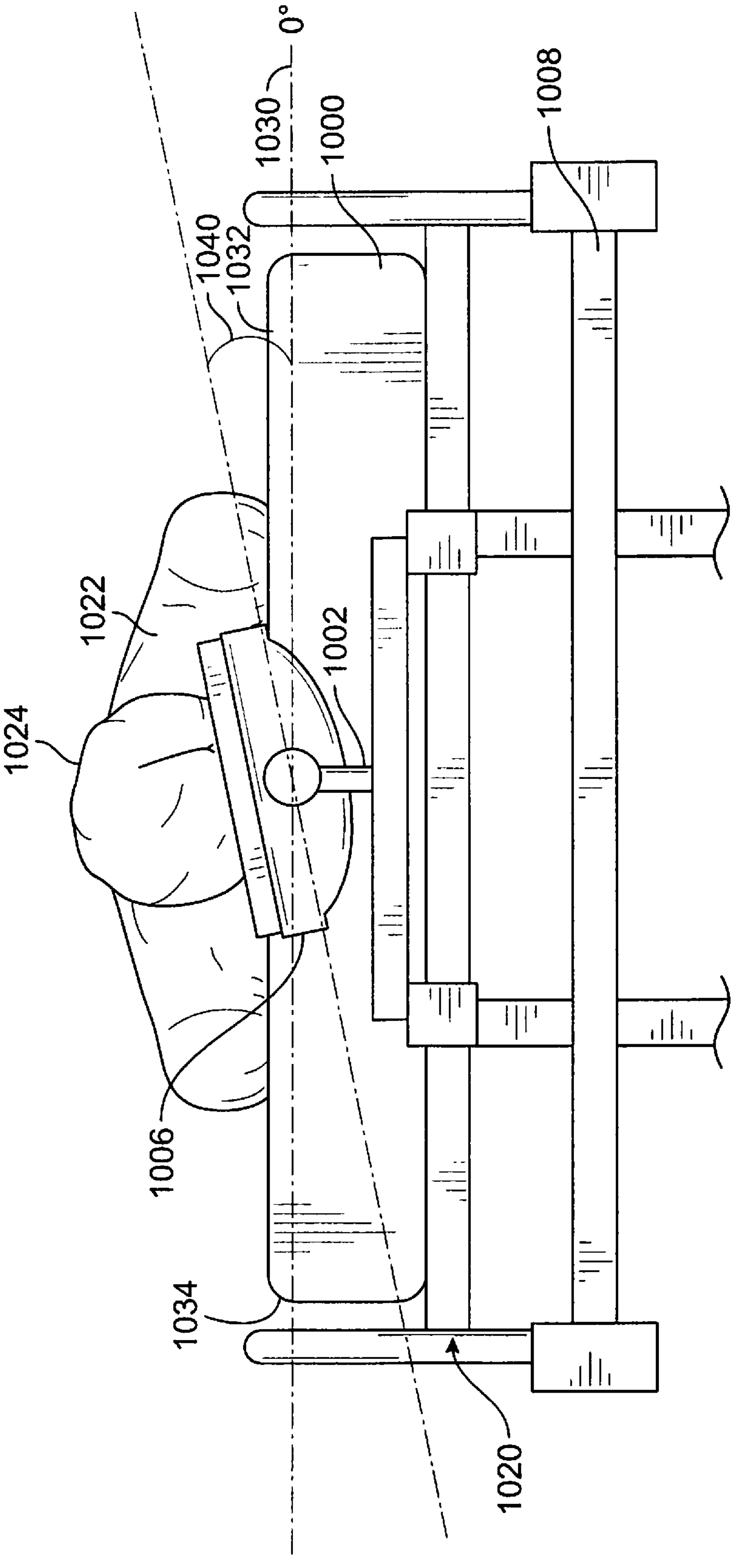
FIG. 18 is a head end view of a patient support apparatus illustrating a lateral angle of a face rest shell.

Referring to FIG. 18, a patient support apparatus 1000 is illustrated having a head rest accessory 1002 extending therefrom. A face rest shell 1006 is coupled to an end 1008 of the frame 1002. In some embodiments, the patient support apparatus 1000 may be the patient support apparatus 12. The head rest accessory 1002 may be the head rest accessory 130, in some embodiments. Additionally, in some embodiments, the face rest shell 1006 may be any one of face rest shells 310, 400, 500, 600, or 700. FIG. 18 illustrates a head end 1020 of the patient support apparatus 1000, wherein the face rest shell 1006 extends from the head end 1020. A patient 1022 is positioned in a prone position on the patient support apparatus 1000. The patient's head 1024 is positioned in the face rest shell 1006.

A lateral axis 1030 extends between a first side 1032 and a second side 1034 of the patient support apparatus 1000. The face rest shell 1006 is configured to be positioned relative to the lateral axis 1030. That is, as described above, the face rest shell 1006 may be rolled relative to the lateral axis 1030. In the illustrated embodiment, the face rest shell 1006 is shown rolled to a lateral angle 1040. The lateral angle 1040 may be any suitable angle greater than 0 degrees that accommodates a morphology of the patient 1022 when the patient's head 1024 is positioned in the face rest shell 1006. Altering the lateral angle 1040 facilitates improving patient comfort and reducing pressure sores on the patient. A caregiver may alter the lateral angle 1040 before the patient's head 1024 is positioned in the face rest shell 1006 utilizing sensors, as described in more detail below. Additionally, the lateral angle 1040 may be further adjusted after the patient's head 1024 is positioned in the face rest shell 1006 utilizing the sensors described below. Although FIG. 18 illustrates the face rest shell 1006 rolled in one direction, it will be appreciated that the face rest shell 1006 may be rolled in either direction.

Figure 19:
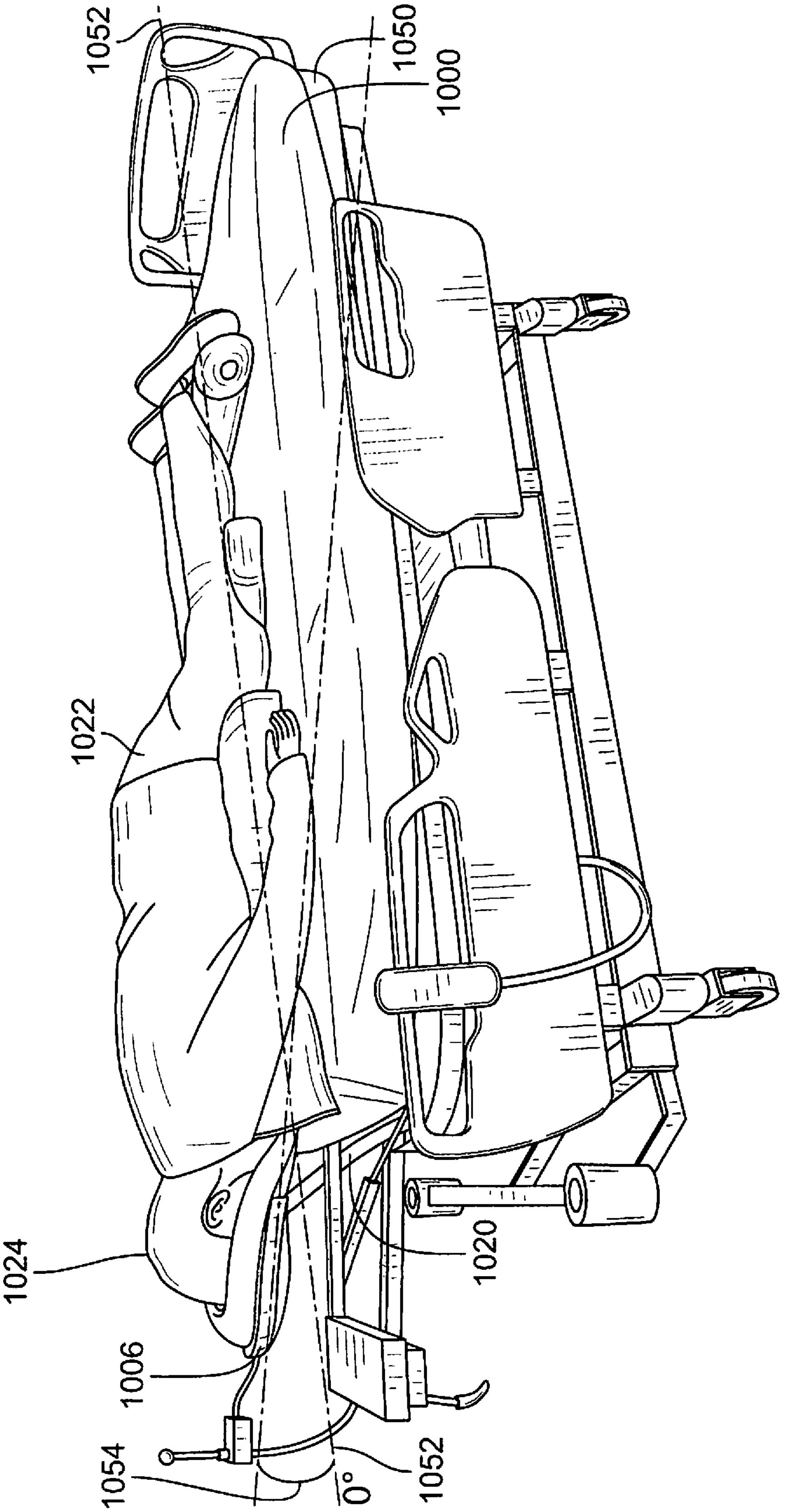
FIG. 19 is a side view of a patient support apparatus illustrating a longitudinal angle of a face rest shell.

Referring now to FIG. 19, the patient support apparatus 1000 extends between the head end 1020 and a foot end 1050. The patient 1022 is positioned on the patient support apparatus 1000 in a prone position between the head end 1020 and the foot end 1050. The patient's head 1024 extends from the head end 1020 of the patient support apparatus 1000 and is positioned in the face rest shell 1006.

A longitudinal axis 1052 extends between the head end 1020 and the foot end 1050 of the patient support apparatus 1000. The face rest shell 1006 is configured to be positioned relative to the longitudinal axis 1052. That is, as described above, the face rest shell 1006 may be pitched relative to the longitudinal axis 1052. In the illustrated embodiment, the face rest shell 1006 is shown pitched to a longitudinal angle 1054. The longitudinal angle 1054 may be any suitable angle greater than 0 degrees that accommodates a morphology of the patient 1022 when the patient's head 1024 is positioned in the face rest shell 1006. Altering the longitudinal angle 1054 facilitates improving patient comfort and reducing pressure sores on the patient. A caregiver may alter the longitudinal angle 1054 before the patient's head 1024 is positioned in the face rest shell 1006 utilizing sensors, as described in more detail below. Additionally, the longitudinal angle 1054 may be further adjusted after the patient's head 1024 is positioned in the face rest shell 1006 utilizing the sensors described below. Although FIG. 19 illustrates the face rest shell 1006 pitch in one direction, it will be appreciated that the face rest shell 1006 may be pitched in either direction.

Figure 20:
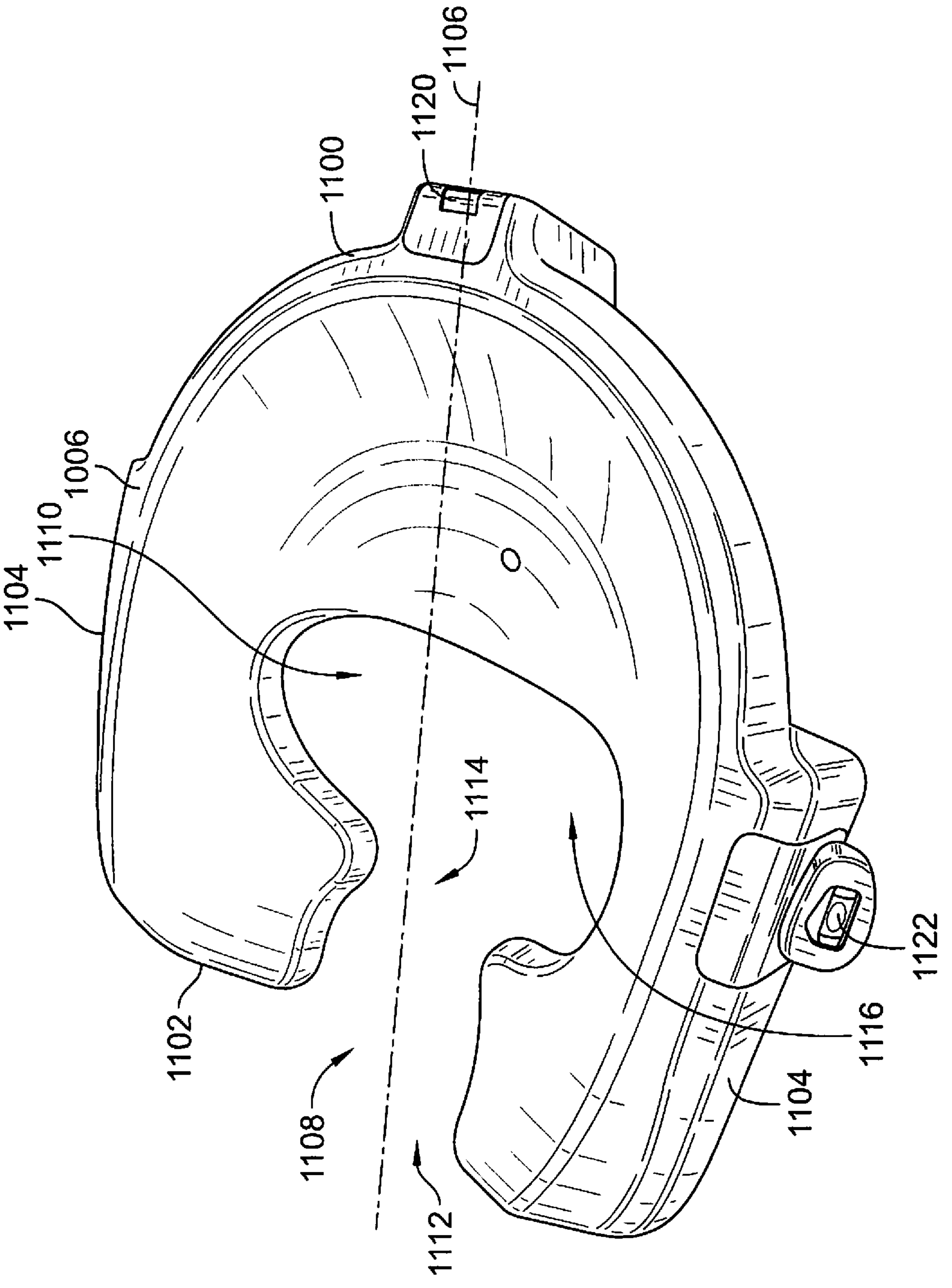
FIG. 20 is a perspective view of an embodiment of a face rest shell having a lateral angle sensor and a longitudinal angle sensor.

Referring to FIG. 20, the face rest shell 1006 includes a head end 1100 and an opposite chin end 1102. A pair of sides 1104 extends between the head end 1100 and the chin end 1102. A centerline 1106 that is substantially equidistant from each side 1104 extends substantially parallel to the sides 1104 between the head end 1100 and the chin end 1102. An opening 1108 is formed in the chin end 1102. A generally T-shaped cutout 1110 extends from the opening 1108 toward the head end 1100. The generally T-shaped cutout 1110 includes chin cutout 1112 that extends from the opening 1108. A nose cutout 1114 extends from the chin cutout 1112 toward the head end 1100, and an eye cutout 1116 extends from the nose cutout 1114 toward the head end 1100.

A lateral sensor 1120 is positioned on the head end 1100 and aligned with the centerline 1106. The lateral sensor 1120 extends across the head end 1100 between the sides 1104. The lateral sensor 1120 is configured to measure the lateral angle 1040 of the face rest shell 1006. A longitudinal sensor 1122 is positioned on one of the sides 1104. It will be appreciated that the longitudinal sensor 1122 may be positioned on either of the sides 1104 or both of the sides 1104. The longitudinal sensor 1122 is substantially aligned with the eye cutout 1116, in the illustrated embodiment. In some embodiments, the longitudinal sensor 1122 may be aligned with the nose cutout 1114 or the chin cutout 1112. The longitudinal sensor 1122 is configured to measure the longitudinal angle 1054 of the face rest shell 1006.

Figure 21:
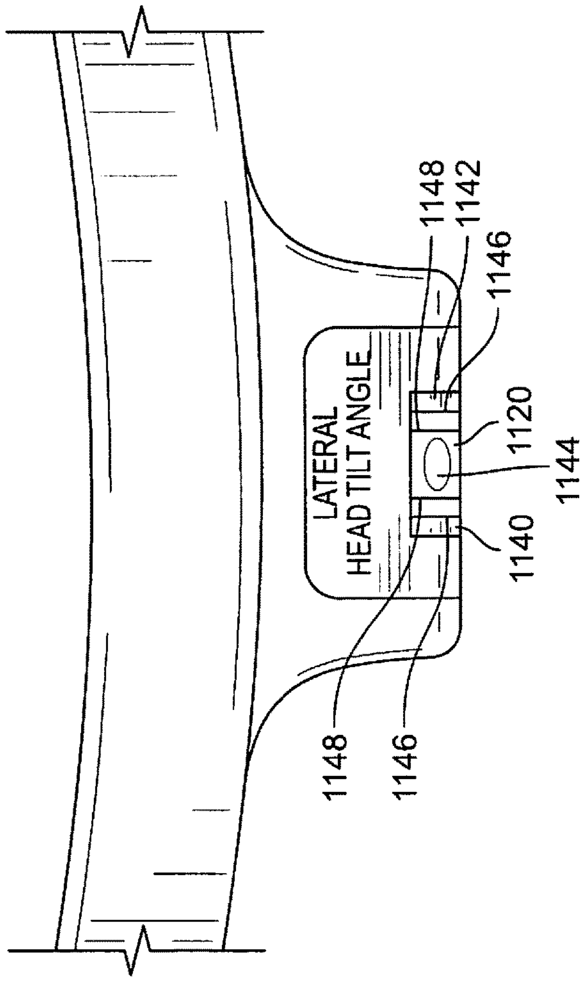
FIG. 21 is a front view of the lateral angle sensor of the face rest shell of FIG. 20.

Referring now to FIG. 21, the lateral sensor 1120 is configured as a spirit level vial 1140 having fluid 1142 retained therein. A bubble 1144 is present in the fluid 1142 and configured to move through the fluid 1142 dependent on the lateral angle 1040 of the face rest shell 1006 and the lateral sensor 1120. A plurality of indicia 1146 are marked on the vial 1140 to indicate a measurement of the lateral angle 1040. For example, if the bubble 1144 is positioned between a pair of center indicia 1148, the lateral sensor 1120 indicates that the lateral angle 1040 is substantially zero. A degree of the roll of the face rest shell 1006 is indicated by an amount to which the bubble 1144 floats outside of the center indicia 1148. It will be appreciated, that additional indicia including angle measurements, e.g. 5 degrees, 10 degrees, etc., may be provided on the head end 1100 or the vial 1140 to provide a measurement of the lateral angle 1140.

Figure 22:
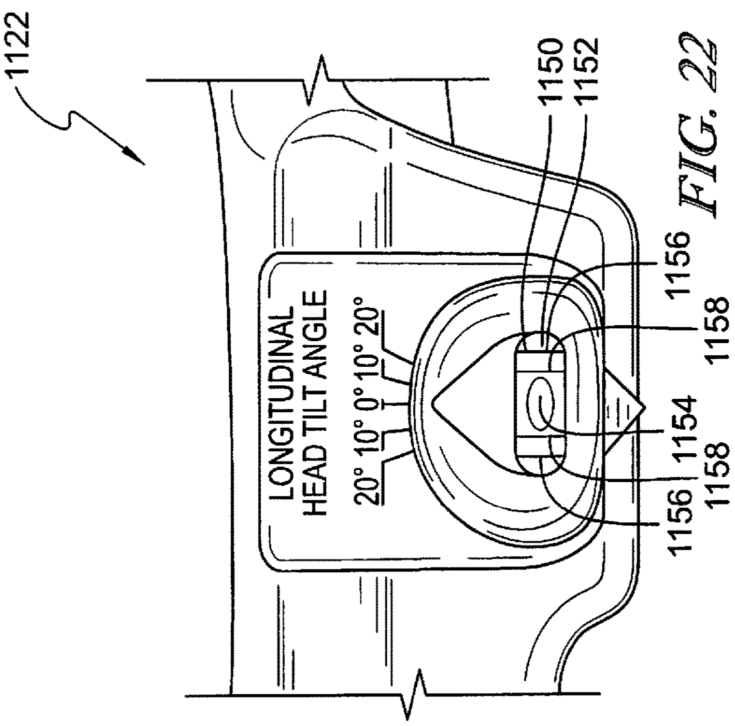
FIG. 22 is a side view of the longitudinal angle sensor of the face rest shell of FIG. 20.

Referring to FIG. 22, the longitudinal sensor 1122 is configured as a spirit level vial 1150 having fluid 1152 retained therein. A bubble 1154 is present in the fluid 1152 and configured to move through the fluid 1152 dependent on the longitudinal angle 1054 of the face rest shell 1006 and the longitudinal sensor 1122. A plurality of indicia 1156 are marked on the vial 1150 to indicate a measurement of the longitudinal angle 1054. For example, if the bubble 1154 is positioned between a pair of center indicia 1158, the longitudinal sensor 1122 indicates that the longitudinal angle 1054 is substantially zero. A degree of the pitch of the face rest shell 1006 is indicated by an amount to which the bubble 1154 floats outside of the center indicia 1158. It will be appreciated, that additional indicia including angle measurements, e.g. 5 degrees, 10 degrees, etc., may be provided on the head end 1100 or the vial 1150 to provide a measurement of the longitudinal angle 1054.

Figure 23:
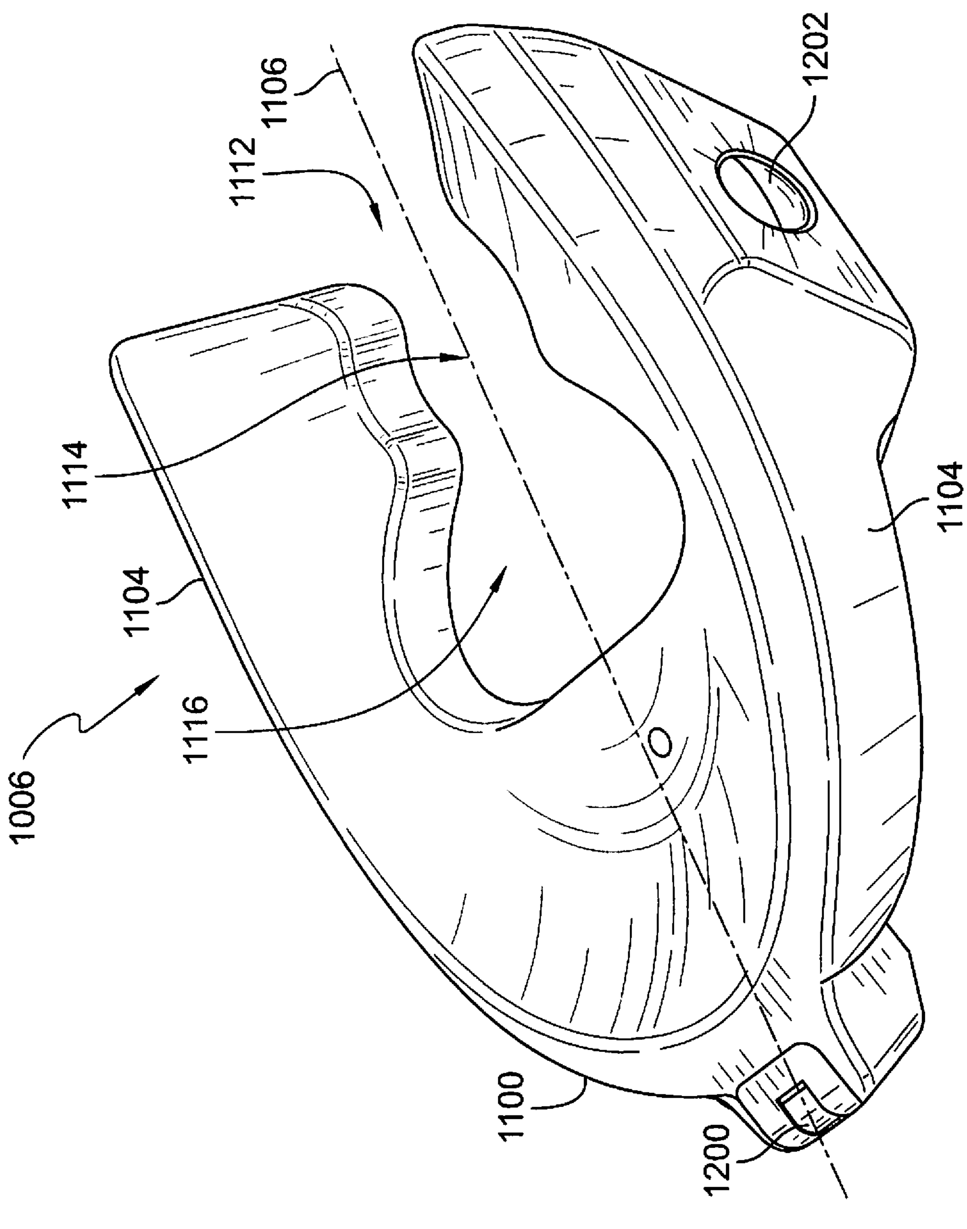
FIG. 23 is a perspective view of another embodiment of a face rest shell having a lateral angle sensor and a longitudinal angle sensor.

FIG. 23 illustrates another embodiment of the face rest shell 1006 having a lateral sensor 1200 positioned on the head end 1100 and aligned with the centerline 1106. The lateral sensor 1200 extends across the head end 1100 between the sides 1104. The lateral sensor 1200 is configured to measure the lateral angle 1040 of the face rest shell 1006. A longitudinal sensor 1202 is positioned on one of the sides 1104. It will be appreciated that the longitudinal sensor 1202 may be positioned on either of the sides 1104 or both of the sides 1104. The longitudinal sensor 1202 is substantially aligned with the eye cutout 1116, in the illustrated embodiment. In some embodiments, the longitudinal sensor 1202 may be aligned with the nose cutout 1114 or the chin cutout 1112. The longitudinal sensor 1202 is configured to measure the longitudinal angle 1054 of the face rest shell 1006.

Figure 24:
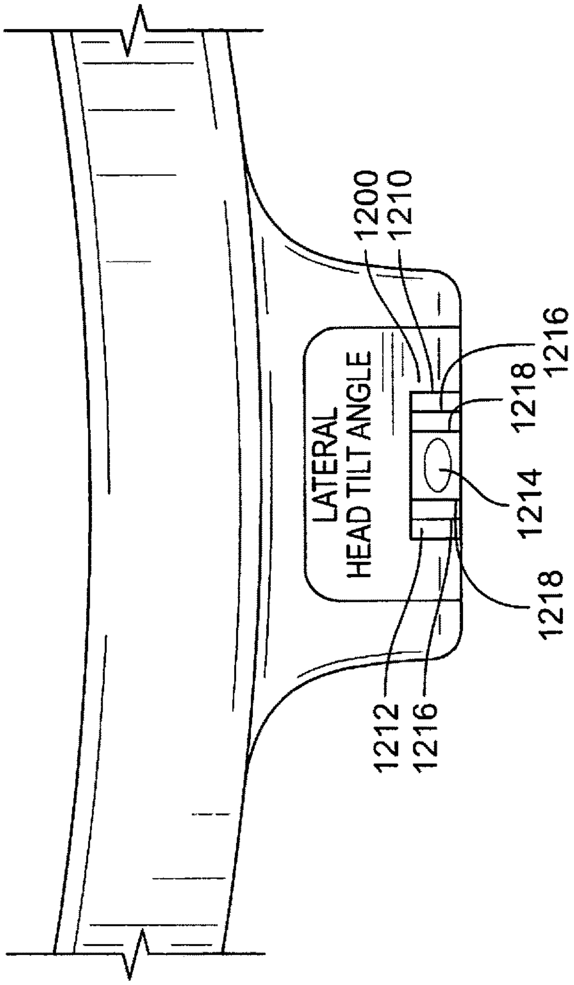
FIG. 24 is a front view of the lateral angle sensor of the face rest shell of FIG. 23.

Referring now to FIG. 24, the lateral sensor 1200 is configured as a spirit level vial 1210 having fluid 1212 retained therein. A bubble 1214 is present in the fluid 1212 and configured to move through the fluid 1212 dependent on the lateral angle 1040 of the face rest shell 1006 and the lateral sensor 1200. A plurality of indicia 1216 are marked on the vial 1210 to indicate a measurement of the lateral angle 1040. For example, if the bubble 1214 is positioned between a pair of center indicia 1218, the lateral sensor 1200 indicates that the lateral angle 1040 is substantially zero. A degree of the roll of the face rest shell 1006 is indicated by an amount to which the bubble 1214 floats outside of the center indicia 1218. It will be appreciated, that additional indicia including angle measurements, e.g. 5 degrees, 10 degrees, etc., may be provided on the head end 1100 or the vial 1210 to provide a measurement of the lateral angle 1140.

Figure 25:
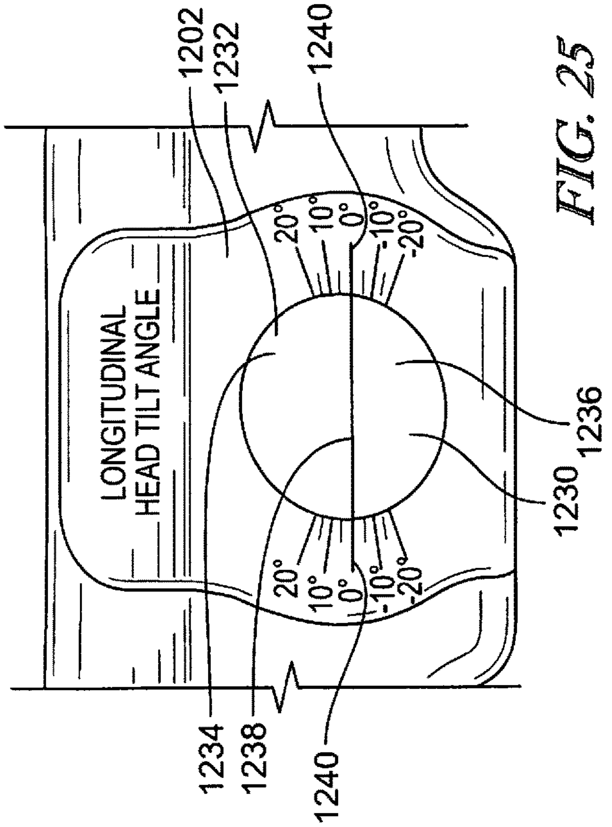
FIG. 25 is a side view of the longitudinal angle sensor of the face rest shell of FIG. 23.

Referring to FIG. 25, the longitudinal sensor 1202 is configured as a liquid level 1230 that includes an artificial horizon inclinometer 1232. The longitudinal sensor 1202 includes a transparent case 1234 filled with a fluid 1236. A top surface 1238 of the fluid 1236 is configured to measure the longitudinal angle 1054. That is, the top surface 1238 of the fluid 1236 remains substantially horizontal while the transparent case 1234 pitches with the face rest shell 1006. When the face rest shell 1006 is pitched, the top surface 1238 of the fluid 1236 aligns with indicia 1240 on the transparent case 1234 or on the face rest shell 1006 around the transparent case 1234 to indicate the longitudinal angle 1054.

Figure 26:
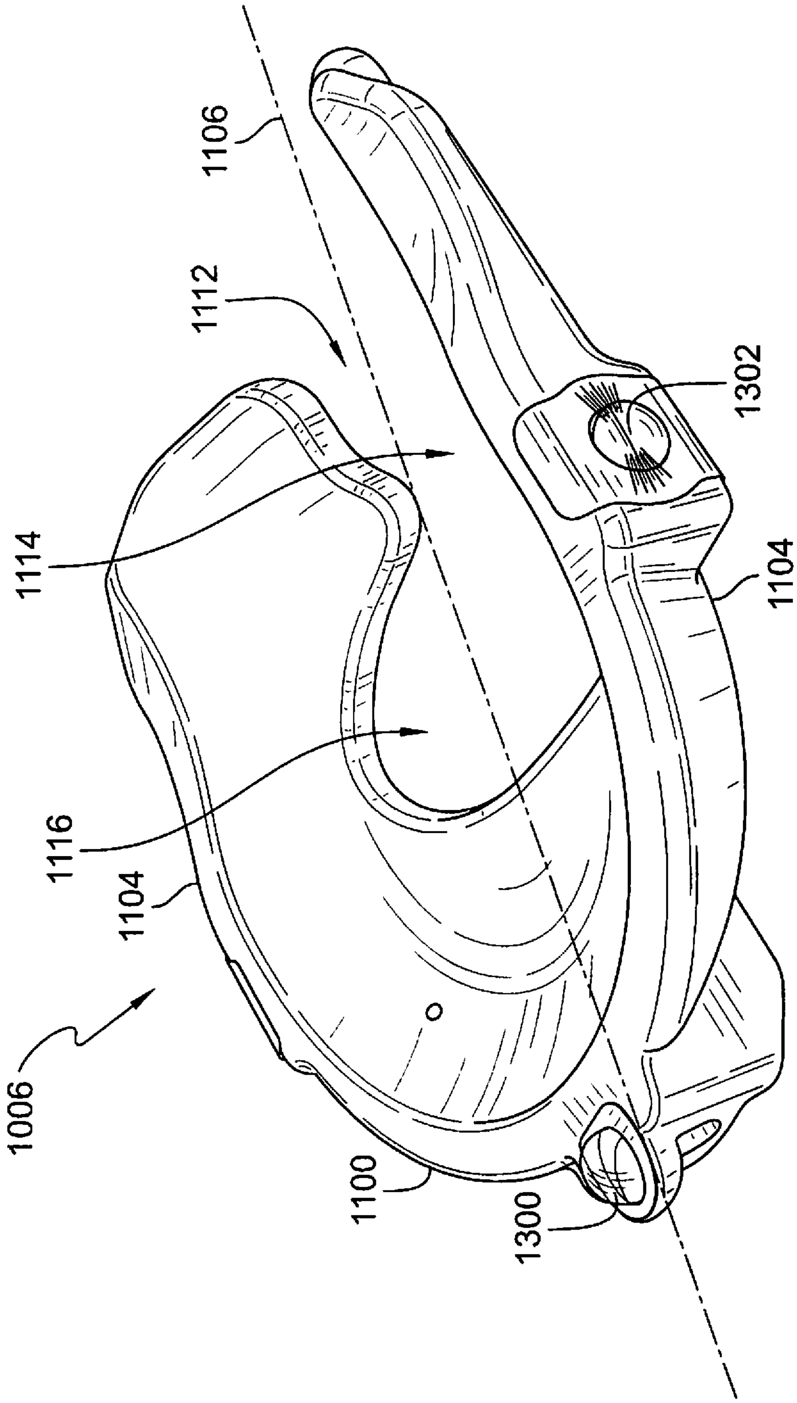
FIG. 26 is a perspective view of yet another embodiment of a face rest shell having a lateral angle sensor and a longitudinal angle sensor.

FIG. 26 illustrates another embodiment of the face rest shell 1006 having a lateral sensor 1300 positioned on the head end 1100 and aligned with the centerline 1106. The lateral sensor 1300 extends across the head end 1100 between the sides 1104. The lateral sensor 1300 is configured to measure the lateral angle 1040 of the face rest shell 1006. A longitudinal sensor 1302 is positioned on one of the sides 1104. It will be appreciated that the longitudinal sensor 1302 may be positioned on either of the sides 1104 or both of the sides 1104. The longitudinal sensor 1302 is substantially aligned with the eye cutout 1116, in the illustrated embodiment. In some embodiments, the longitudinal sensor 1302 may be aligned with the nose cutout 1114 or the chin cutout 1112. The longitudinal sensor 1302 is configured to measure the longitudinal angle 1054 of the face rest shell 1006.

Figure 27:
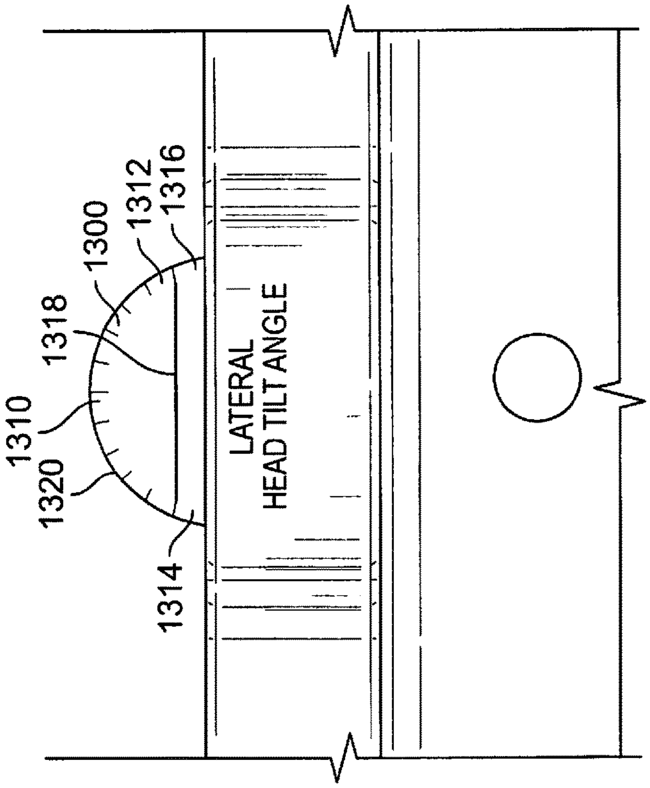
FIG. 27 is a front view of the lateral angle sensor of the face rest shell of FIG. 26.

Referring to FIG. 27, the lateral sensor 1300 is configured as a liquid level 1310 that includes an artificial horizon inclinometer 1312. The lateral sensor 1300 includes a transparent case 1314 filled with a fluid 1316. A top surface 1318 of the fluid 1316 is configured to measure the lateral angle 1040. That is, the top surface 1318 of the fluid 1316 remains substantially horizontal while the transparent case 1314 rolls with the face rest shell 1006. When the face rest shell 1006 is rolled, the top surface 1318 of the fluid 1316 aligns with indicia 1320 on the transparent case 1314 to indicate the lateral angle 1040. It will be appreciated that, since the transparent case 1314 is spherical and three-dimensional, the lateral sensor 1300 may also double as a longitudinal sensor. Specifically, the top surface 1318 of the fluid 1316 also remains substantially horizontal while the transparent case 1314 pitches with the face rest shell 1006. When the face rest shell 1006 is pitched, the top surface 1318 of the fluid 1316 aligns with indicia on the transparent case 1314 to indicate the longitudinal angle 1054.

Figure 28:
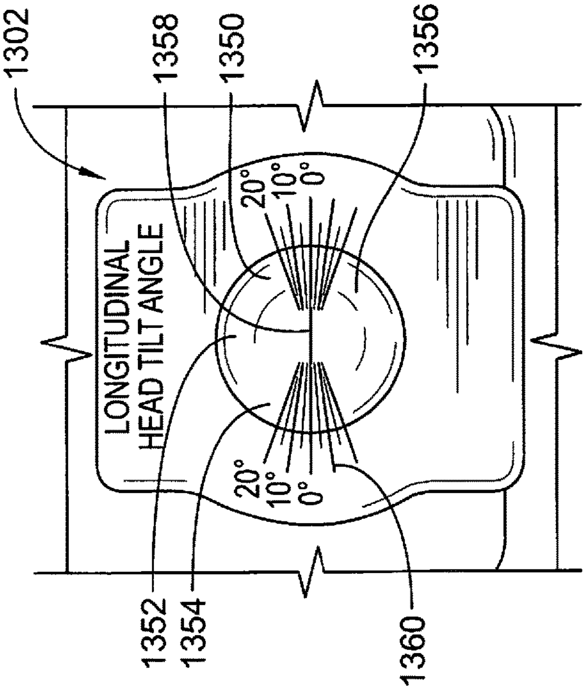
FIG. 28 is a side view of the longitudinal angle sensor of the face rest shell of FIG. 26.

Referring now to FIG. 28, the longitudinal sensor 1302 is configured as a liquid level 1350 that includes an artificial horizon inclinometer 1352. The longitudinal sensor 1302 includes a transparent case 1354 filled with a fluid 1356. A top surface 1358 of the fluid 1356 is configured to measure the longitudinal angle 1054. That is, the top surface 1358 of the fluid 1356 remains substantially horizontal while the transparent case 1354 pitches with the face rest shell 1006. When the face rest shell 1006 is pitched, the top surface 1358 of the fluid 1356 aligns with indicia 1360 on the transparent case 1354 or on the face rest shell 1006 around the transparent case 1354 to indicate the longitudinal angle 1054.

It will be appreciated that the face rest shell 1006 may use any combination of the lateral sensors 1120, 1200, 1300 and longitudinal sensors 1122, 1202, 1302. The lateral sensors 1120, 1200, 1300 and longitudinal sensors 1122, 1202, 1302 described above provide a caregiver a visible and intuitive tilt indicators system on the face rest shell 1006 to easily set a correct position of the face rest shell 1006 according the patient morphology. The lateral sensors 1120, 1200, 1300 and longitudinal sensors 1122, 1202, 1302 facilitate visual management of the tilt angles of the face rest shell 1006 to allow the adjustment of the face rest shell 1006 to prevent and reduce skin injury risks and interface pressure on the patient's face. Efficiency is provided to the caregiver by pre-setting the face rest shell 1006 and allowing ease of use of the face rest shell 1006 during the prone procedure. The lateral sensors 1120, 1200, 1300 and longitudinal sensors 1122, 1202, 1302 provide the caregiver an indication of the tilt angle of the face rest shell 1006 relative to both the longitudinal axis 1052 and the lateral axis 1030. In some embodiments, the face rest shell 1006 may be adjusted before installation of the face rest shell 1006 on the head rest accessory 1002.

Before fixing the face rest shell 1006 on the patient support apparatus 1000, the caregiver can pre-set the lateral angle 1040 and longitudinal angle 1054 of the face rest shell 1006 to avoid adjusting the lateral angle 1040 and longitudinal angle 1054 with the patient's head 1024 in the face rest shell 1006. This pre-setting protocol facilitates saving time and minimizes risks during the patient prone positioning process. Depending on patient morphology and caregiver observation, the caregiver can decide to adjust the lateral angle 1040 and longitudinal angle 1054 of the face rest shell to provide the best ergonomic position for the patient 1022.

Figure 29:
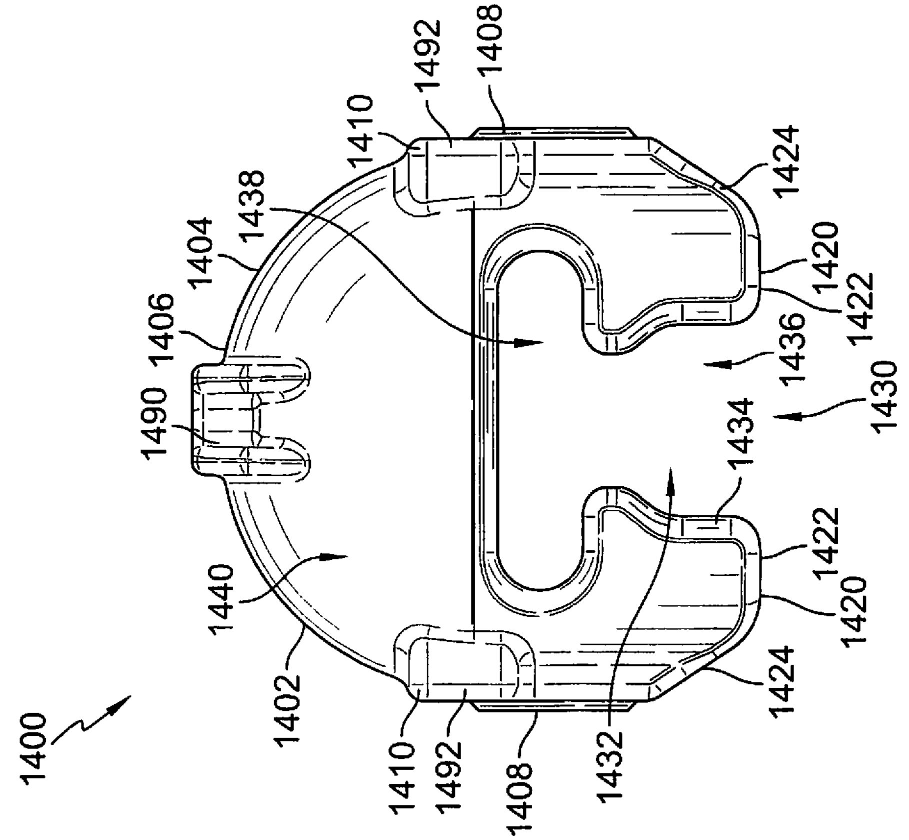
FIG. 29 is a front view of a face rest shell formed in accordance with a further embodiment and showing a downwardly facing convex surface.

Referring now to FIG. 29, a face rest shell 1400 includes an outer perimeter 1402 defined by an outer edge 1404. The outer edge 1404 includes a top outer edge 1406 and a pair of planar side outer edges 1408. In the illustrative embodiment, the top outer edge 1406 is partially circular. The top outer edge 1406 is coupled to each of the side outer edges 1408 by a respective curved outer edge 1410. The side outer edges 1408 extend between the top outer edge 1406 and a bottom outer edge 1420. The bottom outer edge 1420 includes a pair of planar bottom outer edges 1422. Each of the pair of planar bottom edges 1422 is coupled to a respective side outer edge 1408 by an angled outer edge 1424. The planar bottom outer edges 1422 extend substantially perpendicular to the pair of side outer edges 1408.

An opening 1430 is formed in the bottom outer edge 1420. That is, the opening 1430 is formed between the pair of planar bottom outer edges 1422. A cutout 1432 extends from the opening 1430 toward the top outer edge 1406. The cutout 1432 is generally T-shaped and defined by an inner edge 1434. The cutout 1432 includes a mouth cutout 1436 that extends from the opening 1430. An eye cutout 1438 extends from the mouth cutout 1436 toward the top outer edge 1406. A downwardly facing convex surface 1440 extends between the outer edge 1404 and the inner edge 1434.

A top wall 1490 extends from the top outer edge 1406. In the illustrative embodiment, the top wall 1490 extends upwardly from the downwardly facing convex surface 1440. A pair of side walls 1492 extends from the each of the planar side outer edges 1408. In the illustrative embodiment, each of the pair of side walls 1492 extends upwardly from the downwardly facing convex surface 1440.

Figure 30:
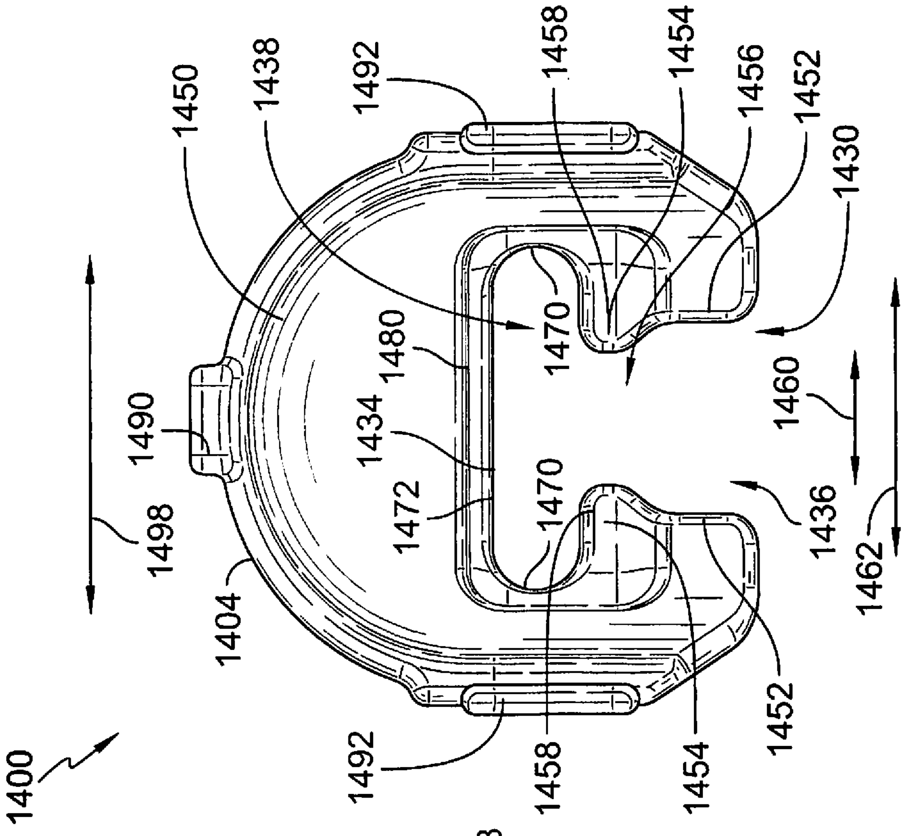
FIG. 30 is a rear view of the face rest shell shown in FIG. 29 and showing an upwardly facing concave surface.

Referring to FIG. 30, the face rest shell 1400 includes an upwardly facing concave surface 1450 extending between the outer edge 1404 and the inner edge 1434. The mouth cutout 1436 includes a pair of side mouth inner edges 1452 extending from the opening 1430 to a cheek rest 1454 that flares inward. The pair of side mouth inner edges 1452 each include a pair of planar side mouth inner edges 1464. A cheek rest opening 1456 is defined between an inwardly most point 1458 of each of the cheek rests 1454. In the illustrated embodiment, the cheek rest opening 1456 has a width 1460 that is less than a width 1462 of the opening 1430.

The eye cutout 1438 extends from the mouth cutout 1436. The eye cutout 1438 extends from the cheek rest opening 1456. The eye cutout 1438 includes a pair of curved inner edges 1470 that extend from the cheek rest opening 1456 to a planar top inner edge 1472. The pair of curved inner edges 1470 are substantially circular. Each cheek rest 1454 is defined between the mouth cutout 1436 and the eye cutout 1438 so that each cheek rest 1454 is defined at least partially by a respective side mouth inner edge 1452 of the mouth cutout 1436 and at least partially by a respective curved inner edge 1470 of the eye cutout 1438. The eye cutout 1438 has a width 1498 that is greater than the widths 1460 and 1462.

A relief surface 1480 is formed in the upwardly facing concave surface 1450. The relief surface 1480 extends along the cheek rest 1454 and around the eye cutout 1438. The relief surface 1480 is configured to reduce pressure on the patient's cheeks and around the patient's eyes when the patient is positioned in a prone position on the face rest shell 600. The relief surface 1480 is configured to distribute interface pressure from protruding facial features of the patient.

The top wall 1490 extends upwardly from the upwardly facing concave surface 1450. Each of the pair of side walls 1492 extends upwardly from the upwardly facing concave surface 1450. The top wall 1490 and the side walls 1492 collectively retain the face cushion 1420 on the upwardly facing concave surface 1450.

Figure 31:
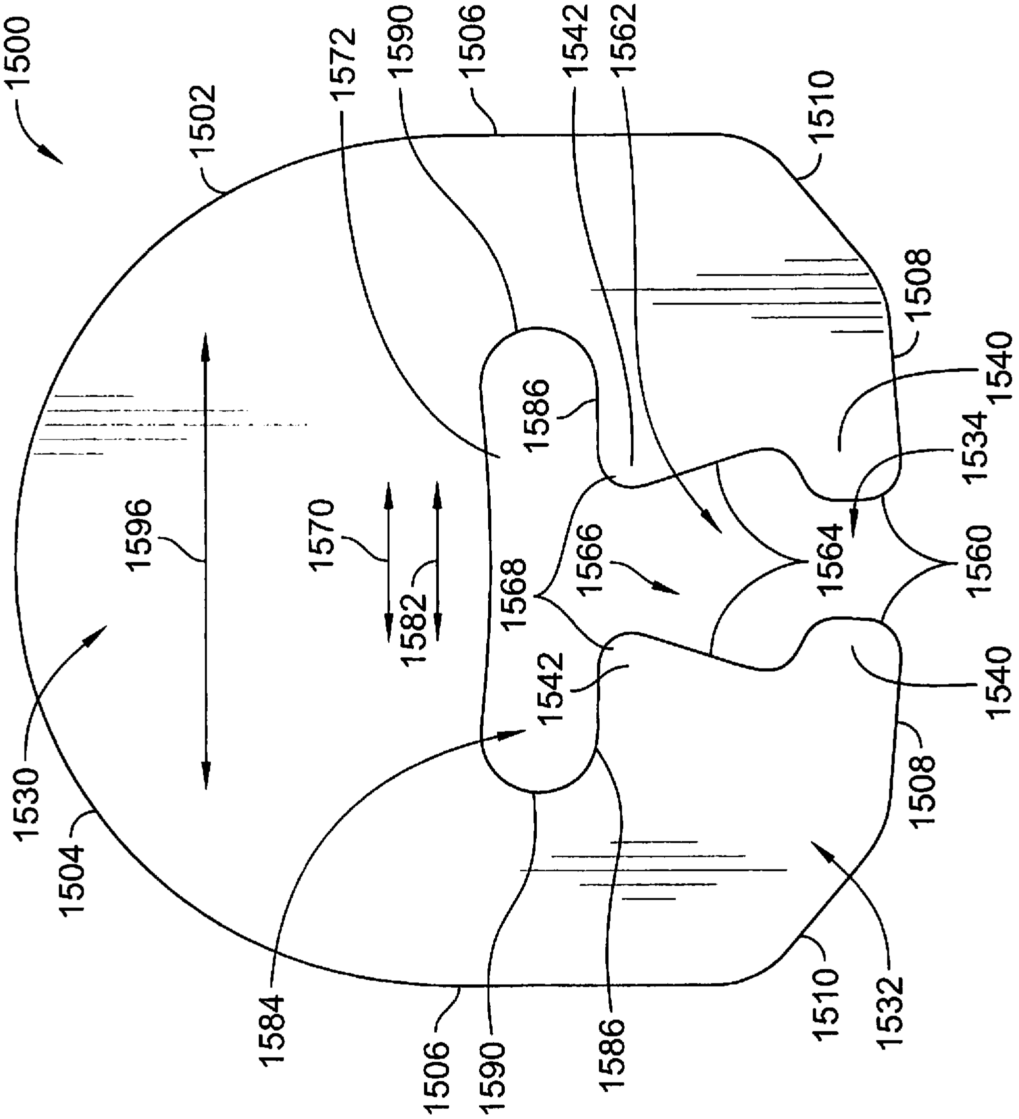
FIG. 31 is a front view of a face cushion formed in accordance with an embodiment.

Referring now to FIG. 31, a face cushion 1500 includes an outer perimeter 1502. The outer perimeter 1502 includes a top outer edge 1504 that is substantially circular. A pair of side outer edges 1506 extend from the top outer edge 1504 to a pair of angled bottom outer edges 1508. That is, the angled bottom outer edges 1508 extend non-orthogonal to the side outer edges 1506. In some embodiments, the bottom outer edges 1508 are not angled and extend substantially perpendicular to the side outer edges 1506. An angled outer edge 1510 extends between each bottom outer edge 1508 and the respective side outer edge 1506.

The face cushion 1500 includes a top end 1530, adjacent the top outer edge 1504, and a bottom end 1532, adjacent the bottom outer edge 1508. The top end 1530 is configured to receive the patient's forehead and the bottom end 1532 is configured to receive the patient's jaw. An opening 1534 is formed in the bottom end 1532 and extends inward from the bottom outer edge 1508 toward the top outer edge 1504. A pair of chin sections 1540 are configured to receive the patient's chin. A pair of cheek bone relief sections 1542 are shaped to support the patient's cheek bones.

The chin sections 1540 are defined by a pair of substantially circular inner edges 1560 extending from the opening 1534. An opening 1580 between the chin sections 1540 has a width 1582. A mouth cutout 1562 extends from the opening 1580 and is defined by a pair of planar mouth side inner edges 1564 extending from the inner edges 1560. The mouth side inner edges 1564 flare inward from the inner edges 1560. A nose cutout 1566 is defined between an inwardly most point 1568 of each of the cheek bone relief sections 1542. In the illustrated embodiment, the nose cutout 1566 has a width 1570 that is substantially equal to the width 1582 of the opening 1580.

An eye cutout 1584 extends from the mouth cutout 1562. The eye cutout 1584 extends from the nose cutout 1566. The eye cutout 1584 includes a pair of planar bottom edges 1586 that extend from the nose cutout 1566. A pair of curved inner edges 1590 extend from the pair of planar bottom edges 1586 to a curved top inner edge 1572. The pair of curved inner edge 1590 are substantially circular. The cheek bone relief sections 1542 are defined between the mouth cutout 1562 and the eye cutout 1584 so the cheek bone relief sections 1542 are defined at least partially the mouth cutout 1562 and at least partially by the eye cutout 1584. The eye cutout 1584 has a width 1596 that is greater than the widths 1582 and 1570.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. A head rest accessory for coupling to a frame member at a head end of a pivotable torso support section of a hospital bed, the head rest accessory comprising a frame having a pair of rails that are spaced apart and substantially parallel and that extend from a distal end to a proximal end, a crossbeam coupled to the distal ends of the pair of rails, a U-shaped connector that is coupled to the proximal ends of a respective rail of the pair of rails, the U-shaped connector opening downwardly to permit the U-shaped connector to be insertable downwardly over the frame member to couple the frame to the pivotable torso support section so that the frame is cantilevered from the frame member, a head rest mount coupled to the frame and extending between the pair of rails, the head rest mount having at least one releasable clamp that grips a corresponding one of the pair of rails to lock the head rest mount in place on the frame when the releasable clamp is in a locked condition, and the head rest mount being repositionable along the pair of rails when the releasable clamp is in an unlocked condition, and a head rest coupled to the head rest mount, the head rest including a face rest shell having an upwardly facing concave surface and having a generally T-shaped cutout to receive a patient's eyes, nose, mouth, and a central chin region of the patient's face when the patient is in a prone position on the head rest accessory, wherein the generally T-shaped cutout includes a chin cutout including an open space configured to receive the patient's central chin region, wherein the face shell includes a pair of cheek rests that flare inwardly to define a cheek rest opening between an inward most point of each of the cheek rests, wherein a cheek rest relief surface is formed in each cheek rest in communication with an eye cutout to facilitate distributing interface pressure from protruding facial features of the patient, wherein each cheek rest relief surface includes a concave surface having a radius of curvature that differs from a radius of curvature of the respective cheek rest, wherein each of the pair of rails includes a loop configured to position over a base frame of the bed when the bed is in a Trendelenburg position, wherein:

the U-shaped connector includes a pair of sockets; and each loop includes a post configured to be inserted into a respective socket, wherein the posts are removably inserted into each of the pair of sockets.

2. The head rest accessory of claim 1, wherein the T-shaped cutout extends from an opening that defines the chin cutout to a mouth cutout having a width that is greater than a width of the chin cutout, wherein an inner edge of the T-shaped cutout flares inwardly between the chin cutout and the mouth cutout, wherein the T-shaped cutout extends from the mouth cutout to the eye cutout which has a width that is greater than the width of the mouth cutout, wherein the inner edge of the T-shaped cutout flares inwardly between the mouth cutout and the eye cutout.

3. The head rest accessory of claim 1, wherein the crossbeam extends orthogonal to each of the pair of rails.

4. The head rest accessory of claim 1, wherein the U-shaped connector extends perpendicular to the frame and includes a pair of flanges and a slot extending between the pair of flanges, wherein each of the pair of flanges includes a planar surface, wherein the slot is defined by the planar surfaces of the pair of flanges.

5. The head rest accessory of claim 1, wherein each of the pair of rails has a rectangular cross-section taken in a vertical plane.

6. The head rest accessory of claim 1, wherein at least a portion of the U-shaped connector includes at least one of a plastic and composite.

7. The head rest accessory of claim 1, wherein the head rest mount is repositionable along the pair of rails along a longitudinal axis of the hospital bed.

8. The head rest accessory of claim 1, wherein the head rest mount includes a base that is repositionable along the pair of rails.

9. The head rest accessory of claim 8, wherein the base includes a track and a body repositionable along the track in a direction perpendicular to the longitudinal axis of the hospital bed.

10. The head rest accessory of claim 9, further comprising:

a post extending vertically from the body, and a mount rail extending from the post and repositionable vertically along the post, wherein the head rest is coupled to a cantilevered end of the rail.

11. The head rest accessory of claim 10, wherein:

the head rest is rotatable about the mount rail in a first rotational direction to roll the head rest, the head rest is rotatable about the mount rail in a second rotational direction to pitch the head rest, and the head rest is rotatable about the mount rail in a third rotational direction to yaw the head rest.

12. The head rest accessory of claim 1, wherein the face rest shell includes:

a downwardly facing convex surface opposite the upwardly facing concave surface, an outer perimeter having a partially circular top outer edge and a bottom outer edge, the outer perimeter including a pair of planar side outer edges extending between the top outer edge and the bottom outer edge, and a bottom opening formed in the bottom outer edge, wherein the generally T-shaped cutout extends from the bottom opening, the generally T-shaped cutout defined by an inner edge, the generally T-shaped cutout including a mouth cutout extending from the opening and an eye cutout extending from the mouth cutout, wherein the eye cutout is defined by a planar top inner edge and a pair of curved inner edges extending from the planar top inner edge, wherein the concave surface and the convex surface extend between the outer edge of the cutout and the outer perimeter.

13. The head rest accessory of claim 12, wherein the face rest shell includes:

a top wall extending from the top outer edge, and a pair of side walls, wherein each of the pair of side walls extends from one of the pair of planar side outer edges.

14. The head rest accessory of claim 13, further comprising a face cushion is positioned on the concave surface of the face rest shell and retained in the concave surface of the face rest shell by the top wall and the pair of side walls.

15. The head rest accessory of claim 14, wherein the face cushion includes a surface that is sized and shaped to the patient's face, wherein the face cushion includes a generally T-shaped cutout to receive a patient's eyes, nose, mouth, and a central chin region of the patient's face when the patient is in a prone position on the head rest accessory.

16. The head rest accessory of claim 1, wherein the face rest shell includes at least one angle sensor attached to the face rest shell to indicate a tilt angle of the face rest shell.

17. The head rest accessory of claim 16, wherein the at least one angle sensor is positioned along a side of the face rest shell and aligned with an eye cutout of the generally T-shaped cutout, wherein the at least one angle sensor measures a longitudinal tilt angle of the face rest shell.

18. The head rest accessory of claim 16, wherein the at least one angle sensor is positioned on a head end of the face rest shell on a centerline of the face rest shell extending between the head end and a chin end of the face rest shell, wherein the at least one angle sensor measures a lateral tilt angle of the face rest shell.

* * * * *